(12) United States Patent
Nakagami et al.

(10) Patent No.: US 11,721,048 B2
(45) Date of Patent: Aug. 8, 2023

(54) IMAGE PROCESSING APPARATUS AND METHOD

(71) Applicant: Sony Corporation, Tokyo (JP)

(72) Inventors: Ohji Nakagami, Tokyo (JP); Koji Yano, Tokyo (JP); Satoru Kuma, Tokyo (JP); Tsuyoshi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 443 days.

(21) Appl. No.: 16/960,910

(22) PCT Filed: Jan. 7, 2019

(86) PCT No.: PCT/JP2019/000051
§ 371 (c)(1),
(2) Date: Jul. 9, 2020

(87) PCT Pub. No.: WO2019/142666
PCT Pub. Date: Jul. 25, 2019

(65) Prior Publication Data
US 2021/0174559 A1 Jun. 10, 2021

(30) Foreign Application Priority Data
Jan. 16, 2018 (JP) .................................. 2018-004983

(51) Int. Cl.
*G06K 9/00* (2022.01)
*G06T 11/00* (2006.01)
(Continued)

(52) U.S. Cl.
CPC .............. *G06T 11/003* (2013.01); *G06T 7/50* (2017.01); *G06T 9/00* (2013.01); *G06T 2207/10028* (2013.01)

(58) Field of Classification Search
CPC ........ H04N 19/00; H04N 19/98; G06F 17/50; G06T 9/40; G06T 15/00; G06T 19/20
See application file for complete search history.

(56) References Cited

U.S. PATENT DOCUMENTS

| 2011/0199379 A1 | 8/2011 | Benien |
| 2014/0204088 A1* | 7/2014 | Kirk ...................... G06T 3/0037 345/427 |

(Continued)

FOREIGN PATENT DOCUMENTS

| CN | 106934861 A | 7/2017 |
| CN | 107481313 A | 12/2017 |

(Continued)

OTHER PUBLICATIONS

Gobbetti E et al: "Layered point clouds:a simple and efficient multiresolution structure for distributing and rendering gigantic point-sampled models", Computers and Graph ics , Els ev ier , GB,vol. 28, No. 6,Dec. 1, 2004 (Dec. 1, 2004),815-826, XP004615299.

(Continued)

*Primary Examiner* — Duy M Dang
(74) *Attorney, Agent, or Firm* — Xsensus LLP

(57) ABSTRACT

The present disclosure relates to an imaging processing apparatus and method by which degradation of the quality due to two-dimensional projection of 3D data can be suppressed.
All pieces of data for each position included in 3D data representative of a three-dimensional structure are projected to a two-dimensional plane of plural layers. Further, all pieces of data for each position of 3D data projected to a two-dimensional plane having the number of layers indicated by layer number information are projected to a three-dimensional space. The present disclosure can be applied, for example, to an information processing apparatus, an (Continued)

image processing apparatus, electronic equipment, an information processing method, and a program.

14 Claims, 24 Drawing Sheets

(51) Int. Cl.
  *G06T 7/50* (2017.01)
  *G06T 9/00* (2006.01)

(56) References Cited

U.S. PATENT DOCUMENTS

| | | |
|---|---|---|
| 2015/0009214 A1 | 1/2015 | Lee |
| 2015/0277378 A1 | 10/2015 | Smithwick |

FOREIGN PATENT DOCUMENTS

| | | |
|---|---|---|
| JP | 2011123776 A | 6/2011 |
| JP | 2012-506573 A | 3/2012 |
| JP | 2016-511457 A | 4/2016 |
| WO | 2016/181202 A1 | 11/2016 |

OTHER PUBLICATIONS

International Search Report and Written Opinion dated Mar. 19, 2019 for PCT/JP2019/000051 filed on Jan. 7, 2019, 8 pages including English Translation of the International Search Report.

Golla, et al., "Real-time Point Cloud Compression," 2015 IEEE/RSJ International Conference on Intelligent Robots and Systems (IROS), IEEE, 2015, pp. 5087-5092.

Mammou, et al., "Video-based and Hierarchical Approaches Point Cloud Compression," Apple Inc., International Organization For Standardization Organisation Internationale De Normalisation ISO/IEC JTC1/SC29/WG11 Coding of Moving Pictures And Associated Audio, ISO/IEC JTC1/SC29/WG11 m41649, Macau, China, Oct. 2017, 3 pages.

Mammou, "PCC Test Model Category 2 v0," 3DG, International Organisation For Standardisation Organisation Internationale De Normalisation ISO/IEC JTC1/SC29/WG11 Coding of Moving Pictures And Audio, ISO/IEC JTC1/SC29/WG11 N17248, Macau, China, Oct. 2017, 11 pages.

\* cited by examiner

FIG. 3

| | OVERVIEW | INFORMATION TO BE TRANSMITTED | EFFECTS |
|---|---|---|---|
| CONVENTIONAL EXAMPLE (TMC2) | Geometry REPRESENTATION BY 2 LAYERS Geometry IS LIMITED TO DEPTH IN Bounding box UNIFORM DEPTH CONTROL ON SCREEN IMAGE | PROJECTION CONTROL INFORMATION IN UNIT OF FRAME | — |
| EMBODIMENT 1 | Geometry REPRESENTATION BY PLURAL LAYERS | Layer NUMBER OF PROJECTION PLANE AND CORRESPONDING Geometry IMAGE | FAITHFUL REPRESENTATION OF Point cloud HAVING THICKNESS AT OBJECT SURFACE |
| EMBODIMENT 2 | ADDITION OF DEFINITION OF "ABSENT Point" | DEFINITION OF PIXEL VALUE OF Point TO BE DELETED BY DECODER (HOWEVER, THIS MAY BE DEFINED IN ADVANCE WITHOUT TRANSMITTING THE SAME) | FAITHFUL REPRESENTATION Of Sparse Point cloud |
| EMBODIMENT 3 | DEPTH CONTROL BY EACH REGION | PARAMETER (TH) FOR CONTROL OF PROJECTION TO Layer IS TRANSMITTED BY EACH PATCH | PICTURE QUALITY CONTROL BY EACH REGION (IMPROVEMENT IN Geometry EFFICIENCY) |

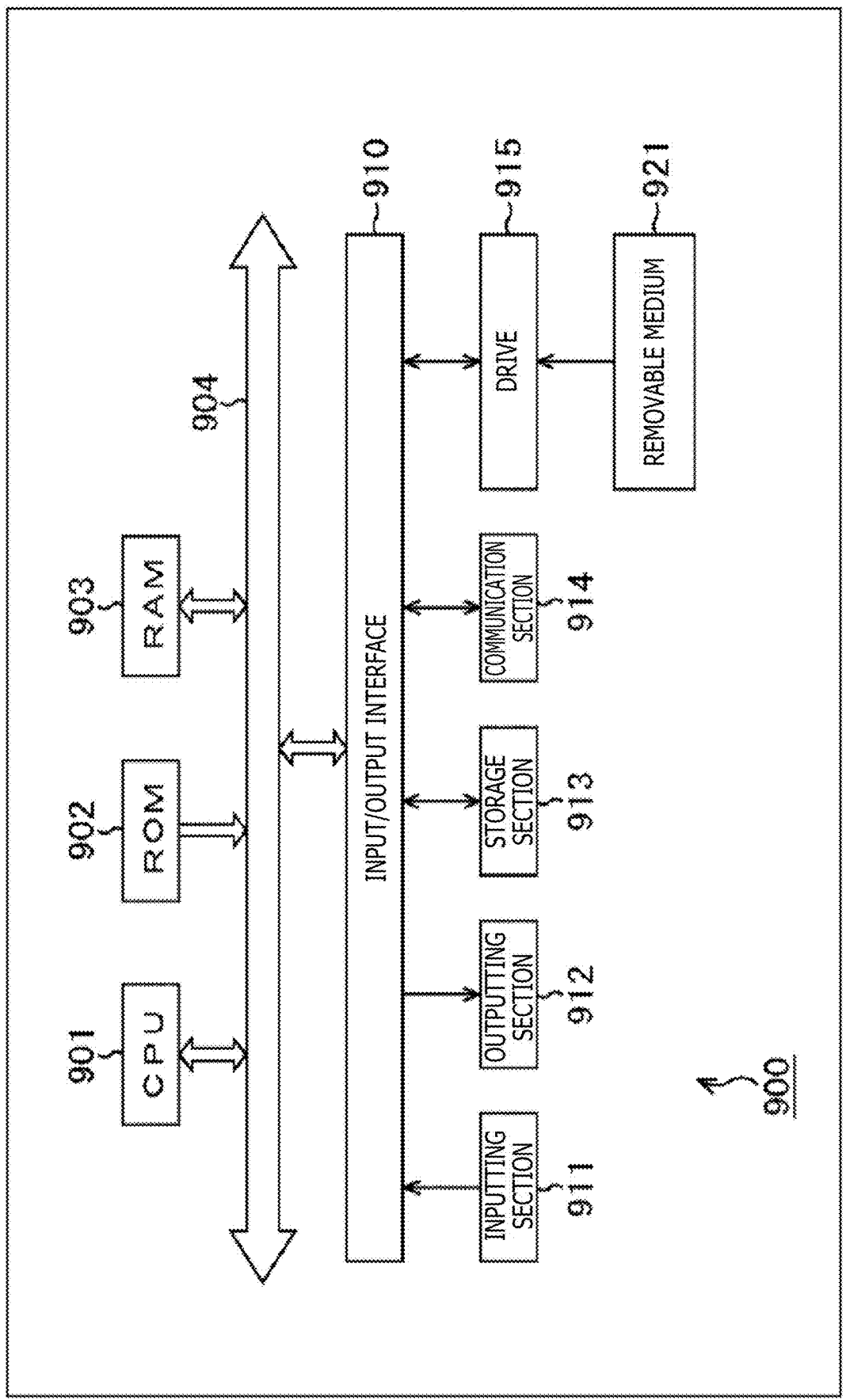

IMAGE PROCESSING APPARATUS AND METHOD

CROSS-REFERENCE TO RELATED APPLICATIONS

The present application is based on PCT filing PCT/JP2019/000051, filed Jan. 7, 2019, which claims priority to JP 2018-004983, filed Jan. 16, 2018, the entire contents of each are incorporated herein by reference.

TECHNICAL FIELD

The present disclosure relates to an imaging processing apparatus and a method and particularly to an image processing apparatus and a method by which degradation of quality by two-dimensional projection of 3D data can be suppressed.

BACKGROUND ART

Conventionally, as an encoding method of 3D data representative of a three-dimensional structure such as a point cloud (Point cloud), for example, an approach of projecting the positions and color information of a point cloud to a two-dimensional plane for each small region and encoding them by an encoding method for a two-dimensional image has been proposed (hereinafter the approach is also referred to as a video-based approach (Video-based approach) (for example, refer to NPL 1 to NPL 3).

CITATION LIST

Non Patent Literature

[NPL 1]
Tim Golla and Reinhard Klein, "Real-time Point Cloud Compression", IEEE, 2015
[NPL 2]
K. Mammou, "Video-based and Hierarchical Approaches Point Cloud Compression", MPEG m41649, October 2017
[NPL 3]
"PCC Test Model Category 2 v0", N17248 MPEG output document, October 2017

SUMMARY

Technical Problem

However, in a point cloud that is an encoding target, a Point also exists at places other than an object surface due to noise or a characteristic of an imaging system. Therefore, it is sometimes difficult to project the point cloud to a two-dimensional plane, and there is a possibility for the quality to be degraded due to encoding that involves such projection to a two-dimensional plane.

The present disclosure has been made in view of such a situation as described above and makes it possible to suppress degradation of the quality due to two-dimensional projection of 3D data.

Solution to Problem

The image processing apparatus of one aspect of the present technology is an image processing apparatus including a two-dimensional projection section configured to project data for each of all positions included in 3D data representative of a three-dimensional structure to a two-dimensional plane of plural layers.

The imaging processing method of the one aspect of the present technology is an image processing method including projecting data for each of all positions included in 3D data representative of a three-dimensional structure to a two-dimensional plane of plural layers.

The image processing apparatus of a different aspect of the present technology is an image processing apparatus including a three-dimensional projection section configured to project data for each of all positions of 3D data projected to a two-dimensional plane having the number of layers indicated by layer number information to a three-dimensional space.

The image processing method of the different aspect of the present technology is an image processing method including projecting data for each of all positions of 3D data projected to a two-dimensional plane having the number of layers indicated by layer number information to a three-dimensional space.

In the image processing apparatus and method of the one aspect of the present technology, data for each of all positions included in 3D data representative of a three-dimensional structure is projected to a two-dimensional plane of plural layers.

In the image processing apparatus and method of the different aspect of the present technology, data for each of all positions of 3D data projected to a two-dimensional plane having the number of layers indicated by layer number information is projected to a three-dimensional space.

Advantageous Effect of Invention

According to the present disclosure, information can be processed. Especially, degradation of the quality due to two-dimensional projection of 3D data can be suppressed.

BRIEF DESCRIPTION OF DRAWINGS

FIG. 3 is a view in which the present technology described herein with reference to embodiments is summarized.

FIG. 24 is a block diagram depicting an example of main components of a computer.

DESCRIPTION OF EMBODIMENTS

In the following, a mode for carrying out the present disclosure (hereinafter referred to as an embodiment) is described. It is to be noted that the description is given in the following order.

1. Video-based approach
2. First embodiment (variable layer number)
3. Second embodiment (definition of absent point)
4. Third embodiment (variable depth parameter)
5. Supplementary note

1. Video-Based Approach

Documents and so Forth Supporting Technical Contents and Technical Terms

The scope disclosed by the present technology includes not only contents described in connection with working examples but also contents described in the following pieces of NPL that were known at the time of filing of the present specification.

NPL 1: (given hereinabove)
NPL 2: (given hereinabove)
NPL 3: (given hereinabove)
NPL 4: TELECOMMUNICATION STANDARDIZATION SECTOR OF ITU (International Telecommunication Union), "Advanced video coding for generic audiovisual services", H.264, 04/2017
NPL 5: TELECOMMUNICATION STANDARDIZATION SECTOR OF ITU (International Telecommunication Union), "High efficiency video coding", H.265, December 2016
NPL 6: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

In short, contents described in the pieces of NPL listed above also serve as the basis when the support requirement in description is to be determined. For example, it is to be recognized that, even if the Quad-Tree Block Structure described in NPL 5 or the QTBT (Quad Tree Plus Binary Tree) Block Structure described in NPL 6 are not described explicitly in the description of the working examples, they remain within the scope of disclosure of the present technology and satisfy the support requirement in description of claims. Further, for example, in regard to such technical terms as parse (Parsing), syntax (Syntax), or semantics (Semantics), it is to be recognized that, even if they are not described explicitly in the description of the working examples, they remain within the scope of the disclosure of the present technology and satisfy the support requirement in description of claims.

<Point Cloud>

Conventionally, data of a point cloud by which a three-dimensional structure is represented by position information, attribute information and like information of a point group, a mesh that includes vertices, edges, and faces and defines a three-dimensional shape using polygon representations, and so forth are available.

Figure 1:
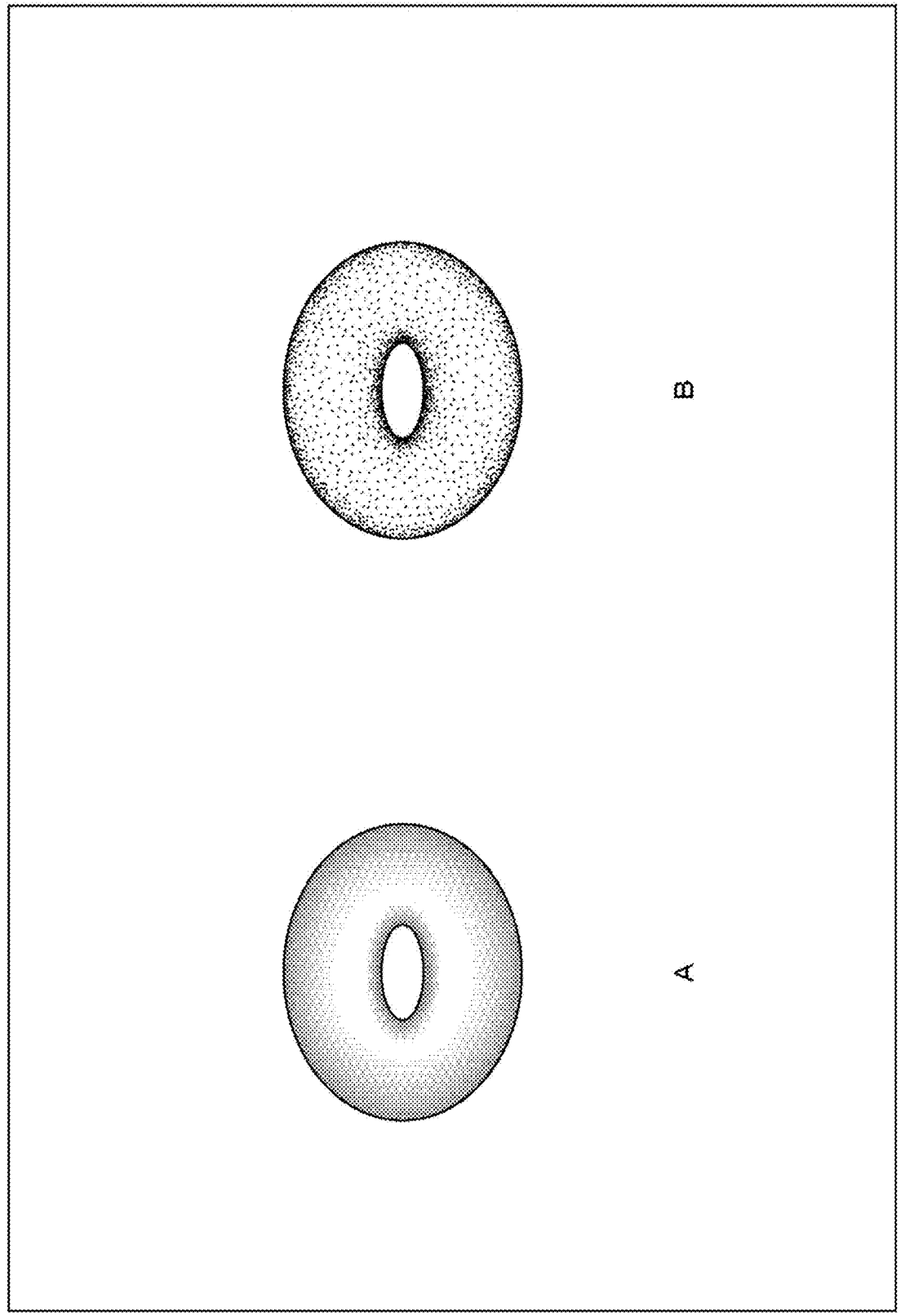
FIG. 1 is a view illustrating an example of a point cloud.
Figure 2:
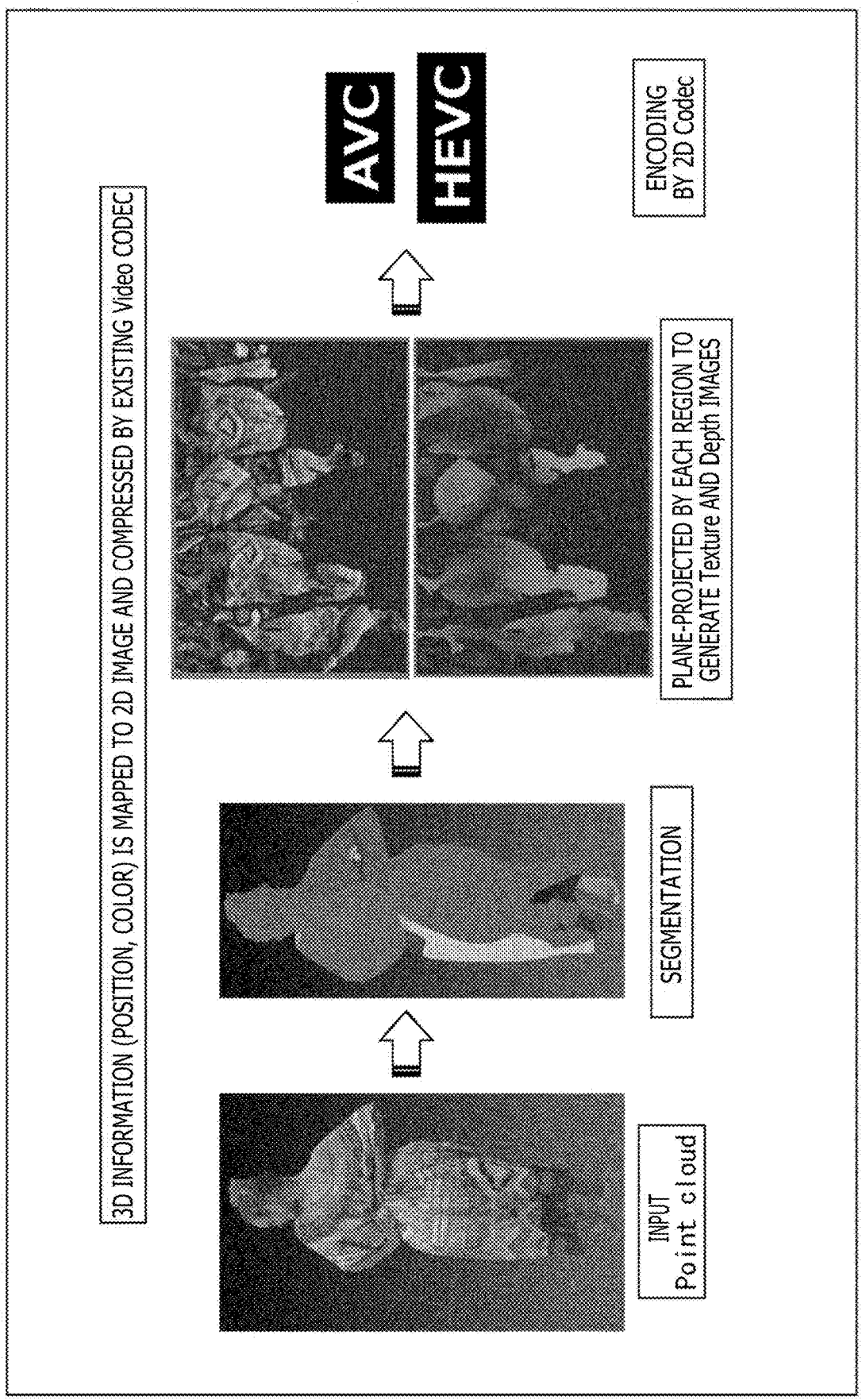
FIG. 2 is a view illustrating an example of an overview of a video-based approach.

For example, in the case of a point cloud, such a three-dimensional structure as depicted in A of FIG. 1 is represented as such an aggregation of a large number of points (point group) as depicted in B of FIG. 1. In short, data of a point cloud includes position information and attribute information (for example, a color or the like) of individual points of the point group. Accordingly, the data structure is relatively simple and any three-dimensional structure can be represented with a sufficiently high degree of accuracy by using a sufficiently great number of points.

<Overview of Video-Based Approach>

A video-based approach (Video-based approach) which projects positions and color information of such a point cloud as described above individually to a two-dimensional plane by each small region and encodes them by an encoding method for a two-dimensional image has been proposed.

In this video-based approach, an inputted point cloud (Point cloud) is divided into plural segmentations (also called regions or patches) and projected by each region to a two-dimensional plane. It is to be noted that data for each position in a point cloud (namely, data of each point) includes position information (Geometry (also called Depth)) and attribute information (Texture) as described hereinabove and is individually projected by each region to a two-dimensional plane.

Then, 3D data (point cloud) projected to the two-dimensional plane is, for example, encoded by an encoding method for a two-dimensional plane image such as AVC (Advanced Video Coding) or HEVC (High Efficiency Video Coding).

<Present Technology Relating to Video-Based Approach>

The present technology relating to such a video-based approach as described above is described. FIG. 3 is a table of the present technology described in the description of embodiments.

In the first stage (without the stage of the item name being counted) from above in this table, a conventional (TMC2) video-based approach is described. In short, in the conventional video-based approach, two-dimensional projection of 3D data is performed with respect to a two-dimensional plane of two layers (two layers). This specification is common to the entire screen image (similar projection is performed to any segment). Accordingly, projection controlling information to be used for such control of projection is signaled as information in a frame unit from the encoding side to the decoding side.

However, in a point cloud that becomes an encoding target, a Point also exists at a location of an object other than the object surface due to noise or a characteristic of the imaging system. Therefore, there is a possibility for projection of data to such a two-dimensional plane of two layers as in the case of such a conventional method as described above to be difficult. Accordingly, there is a possibility that a point that cannot be projected on a two-dimensional plane may appear and the quality of data may be degraded due to encoding that involves projection to a two-dimensional plane.

Further, for example, in the case where a compression target has a Sparse (rough and sparse) nature, projection in a unit of a very small region (Point) is required, and since many small regions are encoded, there is a possibility for both the processing amount and the encoding efficiency to be decreased.

In the second stage (without the stage of the item name being counted) from above in the table of FIG. 3, the present technology described in connection with the first embodiment (working example 1) is described. This method is a method in which the layer (Layer) number of a two-dimensional plane to which 3D data is projected is made variable and the layer number is set such that pieces of data of all points (data for each position) overlapping in the depthwise direction are all projected.

In this case, for example, the information indicative of the layer number may be signaled from the encoding side to the decoding side for each region.

This makes it possible to reproduce a point cloud having a thickness at the object surface more accurately, that is, to suppress degradation of the quality due two-dimensional projection of 3D data.

In the third stage (without the stage of the item name being counted) from above in the table of FIG. 3, the present technology described in connection with the second embodiment (working example 2) is described. This method is a method by which, when 3D data is projected to a two-dimensional plane, a definition of "absent point" is added.

In this case, for example, a definition of a pixel value of a point to be deleted on the decoding side may be signaled from the encoding side to the decoding side.

This makes it possible to reproduce a Sparse point cloud more accurately. In short, projection in a unit of a very small region (Point) becomes unnecessary, and increase of the processing amount and decrease of the encoding efficiency can be suppressed.

In the fourth stage (without the stage of the item name being counted) from above in the table of FIG. 3, the present technology described in connection with the third embodiment (working example 3) is described. This method is a method by which a depth parameter for controlling the range of the depth of 3D data to be projected to a two-dimensional plane can be set for each region.

In this case, for example, the depth parameter may be signaled from the encoding side to the decoding side.

This makes it possible to perform picture quality control for each region and suppress decrease of the efficiency of position information (Geometry).

<Encoding Apparatus>

Figure 4:
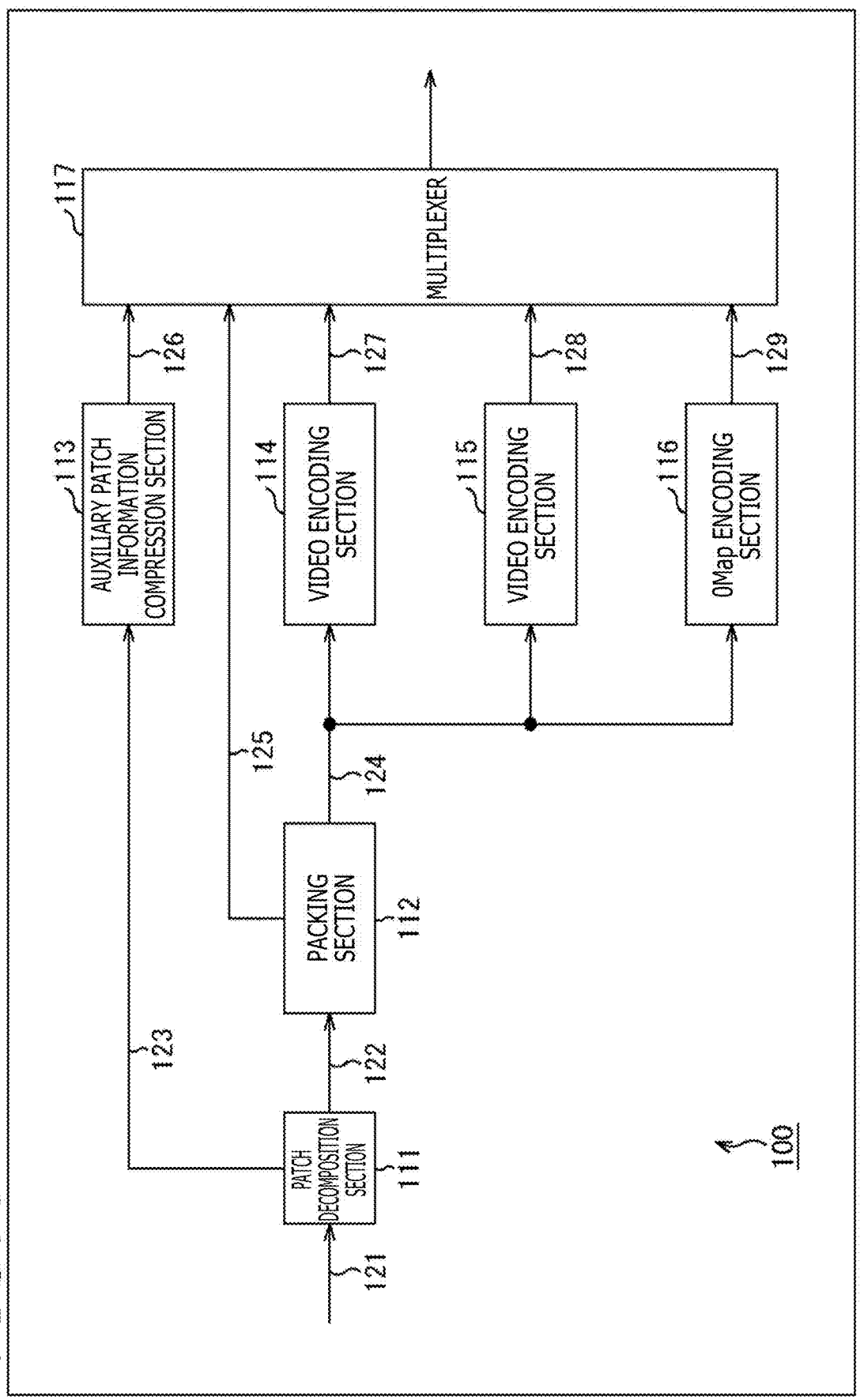
FIG. 4 is a block diagram depicting an example of main components of an encoding apparatus.

Now, a configuration for implementing such various methods as described above is described. FIG. 4 is a block diagram depicting an example of a configuration of an encoding apparatus that is one form of an image processing apparatus to which the present technology is applied. An encoding apparatus 100 depicted in FIG. 4 is an apparatus that projects 3D data such as a point cloud to a two-dimensional plane to perform encoding by an encoding method for a two-dimensional image.

For example, the encoding apparatus 100 implements the technologies described in NPL 1 to NPL 6 and performs encoding of 3D data by a method in compliance with the standard described in any of the pieces of NPL.

It is to be noted that FIG. 4 depicts main ones of processing sections, data flows, and so forth and not all of processing sections, data flows, and so forth are depicted in FIG. 4. In short, the encoding apparatus 100 may include a processing section that is not depicted as a block in FIG. 4 or may have processes or data flows that are not indicated by arrow marks and so forth in FIG. 4. This similarly applies to other figures illustrating processing sections and so forth in the encoding apparatus 100.

As depicted in FIG. 4, the encoding apparatus 100 includes a patch decomposition section 111, a packing section 112, an auxiliary patch information compression section 113, a video encoding section 114, another video encoding section 115, an O Map encoding section 116, and a multiplexer 117.

The patch decomposition section 111 performs a process relating to decomposition of 3D data. For example, the patch decomposition section 111 acquires 3D data (for example, a point cloud) inputted to the encoding apparatus 100 and representative of a three-dimensional structure (arrow mark 121). Further, the patch decomposition section 111 decomposes the acquired 3D data into plural patches and projects the 3D data by each patch to a two-dimensional plane.

The patch decomposition section 111 supplies the 3D data projected by each patch to the two-dimensional plane to the packing section 112 (arrow mark 122). Further, the patch decomposition section 111 supplies auxiliary patch information, which is information relating to the decomposition, to the auxiliary patch information compression section 113 (arrow mark 123).

The packing section 112 performs a process relating to packing of data. For example, the packing section 112 acquires data of a two-dimensional plane to which 3D data is projected by each patch that is supplied from the patch decomposition section 111 (arrow mark 122). Further, the packing section 112 packs different layers of the acquired two-dimensional plane as video frames different from each other. For example, the packing section 112 performs packing of each of position information (Gepmetry) indicative of a position of each point, attribute information (Texture) such as color information to be added to the position information, and an occupancy map (Occupancy Map) indicative of presence or absence of a point, as a video frame.

The packing section 112 supplies the generated video frames to processing sections in a succeeding stage (arrow mark 124). For example, the packing section 112 supplies the generated video frame of the position information (Geometry) to the video encoding section 114. Further, for example, the packing section 112 supplies the generated video frame of the attribute information (Texture) to the video encoding section 115. Furthermore, for example, the packing section 112 supplies the generated video frame of the occupancy map to the O Map encoding section 116.

Further, the packing section 112 supplies control information relating to the packing to the multiplexer 117 (arrow mark 125).

The auxiliary patch information compression section 113 performs a process relating to compression of auxiliary patch information. For example, the auxiliary patch information compression section 113 acquires data to be supplied from the patch decomposition section 111 (arrow mark 123).

The auxiliary patch information compression section 113 encodes (compresses) auxiliary patch information included in the acquired data. The auxiliary patch information compression section 113 supplies the resulting encoded data of the auxiliary patch information to the multiplexer 117 (arrow mark 126).

The video encoding section 114 performs a process relating to encoding of a video frame of position information (Geometry). For example, the video encoding section 114 acquires a video frame of position information (Geometry) to be supplied from the packing section 112 (arrow mark 124). Further, the video encoding section 114 encodes the acquired video frame of the position information (Geometry) by any encoding method for a two-dimensional image such as AVC or HEVC, for example. The video encoding section 114 supplies the encoded data obtained by the encoding (the encoded data of the video frame of the position information (Geometry)) to the multiplexer 117 (arrow mark 127).

The video encoding section 115 performs a process relating to encoding of a video frame of attribute information (Texture). For example, the video encoding section 115 acquires a video frame of attribute information (Texture) to be supplied from the packing section 112 (arrow mark 124). Further, the video encoding section 115 encodes the acquired video frame of the attribute information (Texture) by any encoding method for a two-dimensional image such as AVC or HEVC, for example. The video encoding section 115 supplies the encoded data obtained by the encoding (encoded data of the video frame of the attribute information (Texture)) to the multiplexer 117 (arrow mark 127.

The O Map encoding section 116 performs a process relating to encoding of a video frame of an occupancy map. For example, the O Map encoding section 116 acquires a video frame of an occupancy map to be supplied from the packing section 112 (arrow mark 124). Further, the O Map encoding section 116 encodes the acquired video frame of the occupancy map by any encoding method for a two-dimensional image such as AVC or HEVC, for example. The O Map encoding section 116 supplies the encoded data obtained by the encoding (encoded data of the video frame of the occupancy map) to the multiplexer 117 (arrow mark 129).

The multiplexer 117 performs a process relating to multiplexing. For example, the multiplexer 117 acquires encoded data of auxiliary patch information to be supplied from the auxiliary patch information compression section 113 (arrow mark 126). Further, for example, the multiplexer 117 acquires control information relating to packing to be supplied from the packing section 112 (arrow mark 125). Further, for example, the multiplexer 117 acquires encoded data of a video frame of position information (Geometry) to be supplied from the video encoding section 114 (arrow mark 127). Further, for example, the multiplexer 117 acquires encoded data of a video frame of attribute information (Texture) to be supplied from the video encoding section 115 (arrow mark 128). Further, for example, the multiplexer 117 acquires encoded data of a video frame of an occupancy map to be supplied from the O Map encoding section 116.

The multiplexer 117 multiplexes such pieces of information acquired as mentioned above to generate a bit stream. The multiplexer 117 outputs the generated bit stream to the outside of the encoding apparatus 100 (arrow mark 130).

<Patch Decomposition Section>

Figure 5:
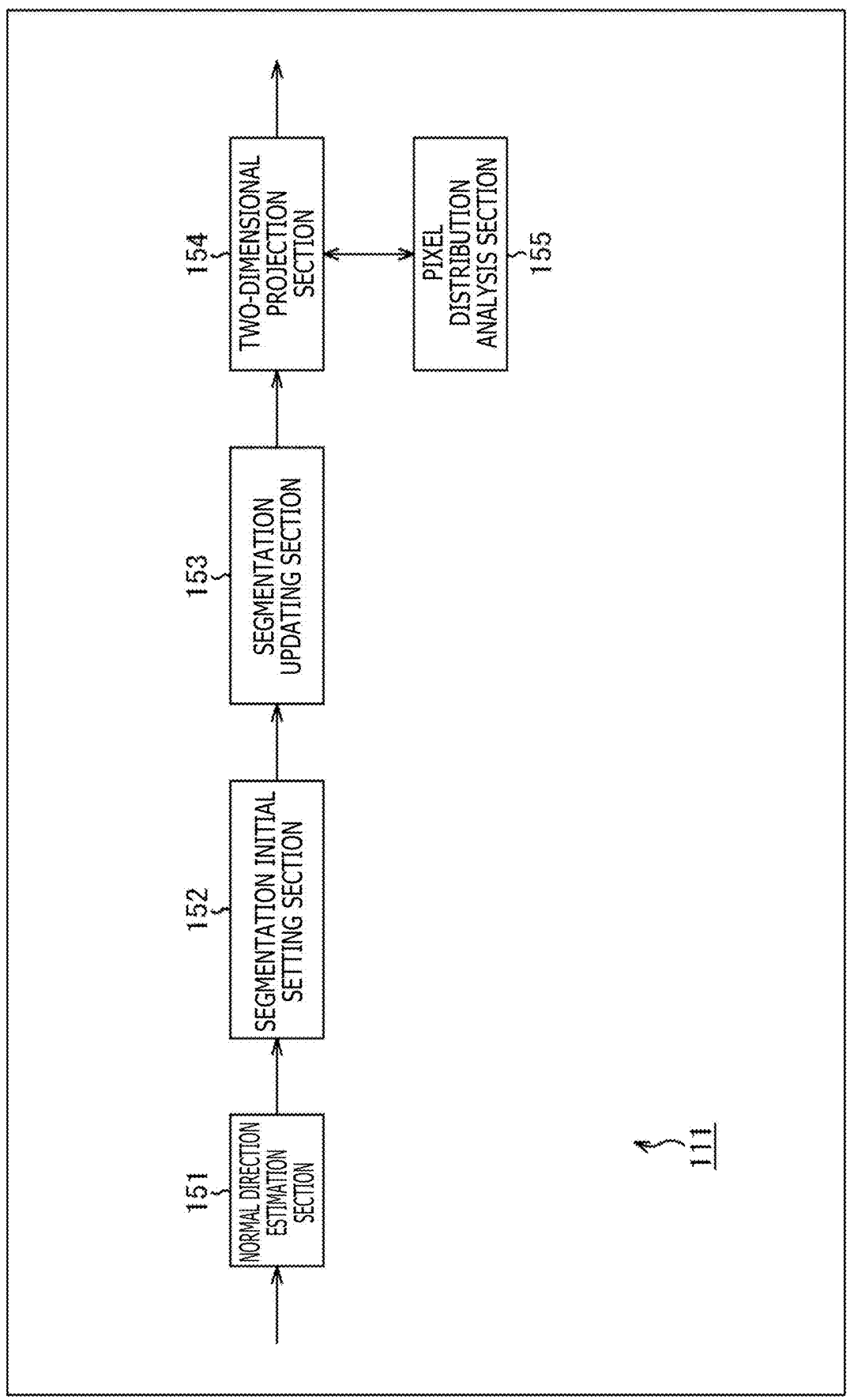
FIG. 5 is a view illustrating an example of main components of a patch decomposition section.

FIG. 5 is a block diagram depicting an example of main components of the patch decomposition section 111. As depicted in FIG. 5, the patch decomposition section 111 in this case includes a normal direction estimation section 151, a segmentation initial setting section 152, a segmentation updating section 153, a two-dimensional projection section 154, and a pixel distribution analysis section 155.

The normal direction estimation section 151 performs a process relating to estimation of a direction normal to the surface of 3D data. For example, the normal direction estimation section 151 acquires 3D data to be inputted thereto. Further, the normal direction estimation section 151 estimates a direction normal to the surface of an object represented by the acquired 3D data. For example, the normal direction estimation section 151 constructs a kd-tree, searches the proximity, and calculates an optimum approximate tangent plane to estimate a normal direction. The normal direction estimation section 151 supplies an estimation result of the normal direction to the segmentation initial setting section 152 together with other pieces of data.

The segmentation initial setting section 152 performs a process relating to initial setting for segmentation. For example, the segmentation initial setting section 152 acquires data to be supplied from the normal direction estimation section 151. Further, for example, the segmentation initial setting section 152 classifies, on the basis of components in six axes of a normal direction estimated by the normal direction estimation section 151, a face of 3D data corresponding to the normal direction. The segmentation initial setting section 152 supplies a result of the classification to the segmentation updating section 153 together with other pieces of data.

The segmentation updating section 153 performs a process relating to updating of segmentation. For example, the segmentation updating section 153 acquires data to be supplied from the segmentation initial setting section 152. Then, the segmentation updating section 153 puts together excessively small regions in the segmentation of the initial setting set by the segmentation initial setting section 152 to form a sufficiently large region. The segmentation updating section 153 supplies information relating to the updated segmentation to the two-dimensional projection section 154 together with other pieces of information.

The two-dimensional projection section 154 performs a process relating to two-dimensional projection of 3D data. For example, the two-dimensional projection section 154 acquires data to be supplied from the segmentation updating section 153. Further, the two-dimensional projection section 154 uses the pixel distribution analysis section 155 to generate an occupancy map of 3D data included in the acquired data and projects the 3D data or the occupancy data by each region to a two-dimensional plane. The two-dimensional projection section 154 supplies the 3D data projected to the two-dimensional plane to the packing section 112 together with other pieces of data.

The pixel distribution analysis section 155 performs a process relating to analysis of a pixel distribution of 3D data that is a processing target by the two-dimensional projection section 154.

<Decoding Apparatus>

Figure 6:
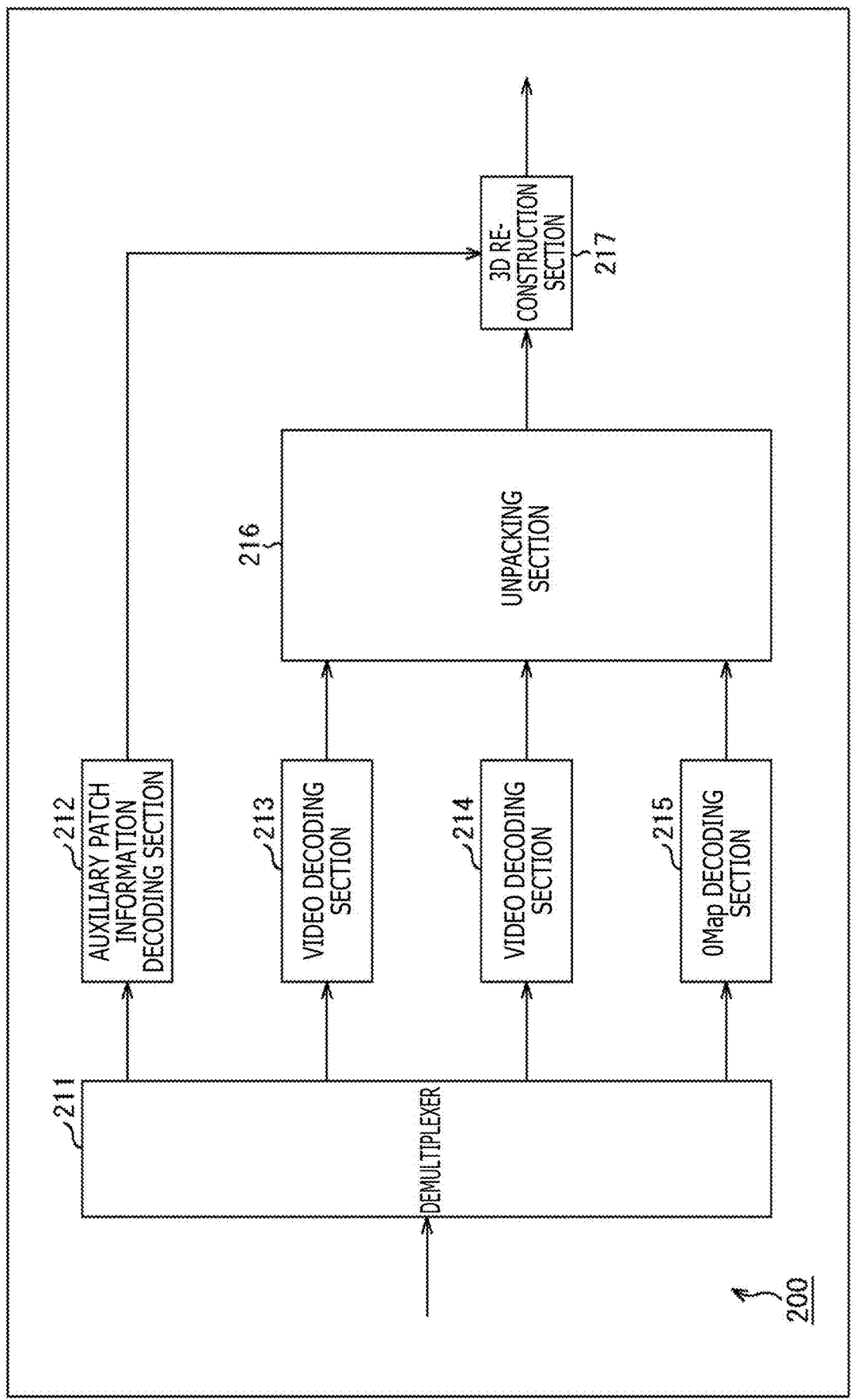
FIG. 6 is a block diagram depicting an example of main components of a decoding apparatus.

FIG. 6 is a block diagram depicting an example of a configuration of a decoding apparatus that is a form of an image processing apparatus to which the present technology is applied. A decoding apparatus 200 depicted in FIG. 6 is an apparatus by which encoded data formed by projecting 3D data such as a point cloud to a two-dimensional plane and encoding such projected 3D data is decoded by a decoding method for a two-dimensional image and projected to a three-dimensional space.

For example, the decoding apparatus 200 implements the technologies described in NPL 1 to NPL 6 and performs decoding of encoded data of 3D data by a method in compliance with the standard described in any of the pieces of NPL.

It is to be noted that FIG. 6 depicts main ones of processing sections, data flows, and so forth and not all of processing sections, data flows, and so forth are depicted in FIG. 6. In short, the decoding apparatus 200 may include a processing section that is not depicted as a block in FIG. 6 or may have processes or data flows that are not indicated by arrow marks and so forth in FIG. 6. This similarly applies to the other figures illustrating processing sections and so forth in the decoding apparatus 200.

As depicted in FIG. 6, the decoding apparatus 200 includes a demultiplexer 211, an auxiliary patch information decoding section 212, a video decoding section 213, another video decoding section 214, an O Map decoding section 215, an unpacking section 216, and a 3D re-construction section 217.

The demultiplexer 211 performs a process relating to demultiplexing of data. For example, the demultiplexer 211 acquires a bit stream inputted to the decoding apparatus 200. This bit stream is supplied, for example, from the encoding apparatus 100. The demultiplexer 211 demultiplexes the bit stream, extracts encoded data of auxiliary patch information, and supplies the extracted encoded data to the auxiliary patch information decoding section 212. Further, the demultiplexer 211 extracts encoded data of a video frame of position information (Geometry) from a bit stream by demultiplexing and supplies the extracted encoded data to the video decoding section 213. Further, the demultiplexer 211 extracts encoded data of a video frame of attribute information (Texture) from the bit stream by demultiplexing and supplies the extracted encoded data to the video decoding section 214. Further, the demultiplexer 211 extracts encoded data of a video frame of an occupancy map from the bit stream by demultiplexing and supplies the extracted encoded data to the O Map decoding section 215.

The auxiliary patch information decoding section 212 performs a process relating to decoding of encoded data of auxiliary patch information. For example, the auxiliary patch information decoding section 212 acquires encoded data of auxiliary patch information supplied from the demultiplexer 211. Further, the auxiliary patch information decoding section 212 decodes encoded data of auxiliary patch information included in the acquired data. The auxiliary patch information decoding section 212 supplies the auxiliary patch information obtained by the decoding to the 3D re-construction section 217.

The video decoding section 213 performs a process relating to decoding of encoded data of a video frame of position information (Geometry). For example, the video decoding section 213 acquires encoded data of a video frame of position information (Geometry) supplied from the demultiplexer 211. Further, for example, the video decoding section 213 decodes the acquired encoded data to obtain a video frame of the position information (Geometry). The video decoding section 213 supplies the video frame of the position information (Geometry) to the unpacking section 216.

The video decoding section 214 performs a process relating to decoding of encoded data of a video frame of attribute information (Texture). For example, the video decoding section 214 acquires encoded data of a video frame of attribute information (Texture) supplied from the demultiplexer 211. Further, for example, the video decoding section 214 decodes the acquired encoded data to obtain a video frame of the attribute information (Texture). The video decoding section 214 supplies the video frame of the attribute information (Texture) to the unpacking section 216.

The O Map decoding section 215 performs a process relating to decoding of encoded data of a video frame of an occupancy map. For example, the O Map decoding section 215 acquires encoded data of a video frame of an occupancy map supplied from the demultiplexer 211. Further, for example, the O Map decoding section 215 decodes the acquired encoded data to obtain a video frame of the occupancy map. The O Map decoding section 215 supplies the video frame of the occupancy map to the unpacking section 216.

The unpacking section 216 performs a process relating to unpacking. For example, the unpacking section 216 acquires a video frame of position information (Geometry) from the video decoding section 213, acquires a video frame of attribute information (Texture) from the video decoding section 214, and acquires a video frame of an occupancy map from the O Map decoding section 215. The unpacking section 216 unpacks the video frames. The unpacking section 216 supplies data of the position information (Geometry), data of the attribute information (Texture), and data of the occupancy map that are obtained by the unpacking to the 3D re-construction section 217.

The 3D re-construction section 217 performs a process relating to re-construction of 3D data. For example, the 3D re-construction section 217 re-constructs 3D data on the basis of auxiliary patch information supplied from the auxiliary patch information decoding section 212 and data of position information (Geometry), data of attribute information (Texture), data of an occupancy map that are supplied from the unpacking section 216. The 3D re-construction section 217 outputs the 3D data obtained by such processes as described above to the outside of the decoding apparatus 200.

This 3D data is supplied, for example, to a display section such that an image thereof is displayed, is recorded on a recording medium, or is supplied to a different apparatus through communication.

<3D Re-Construction Section>

Figure 7:
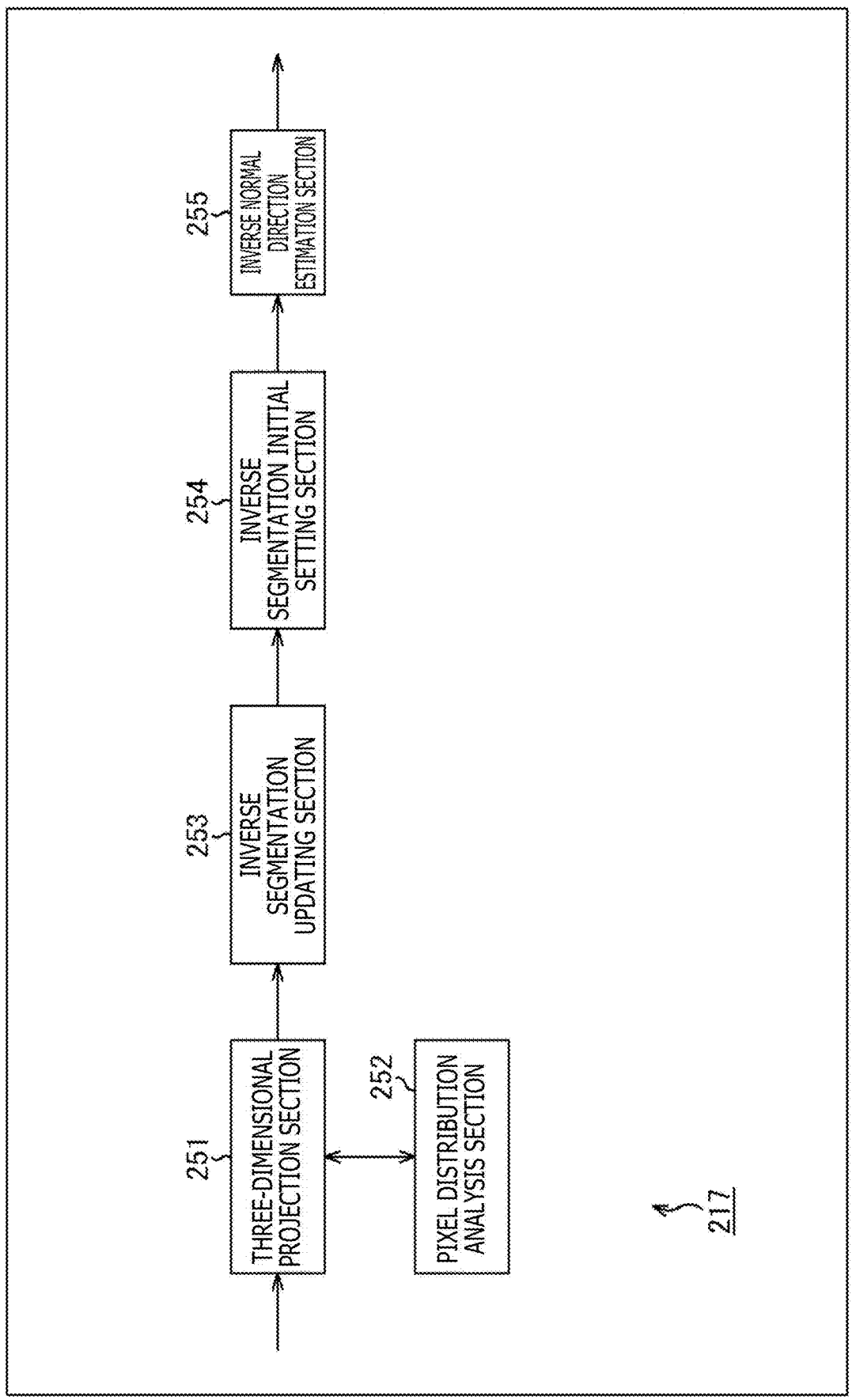
FIG. 7 is a block diagram depicting an example of main components of a 3D re-construction section.

FIG. 7 is a block diagram depicting an example of main components of the 3D re-construction section 217 of FIG. 6. As depicted in FIG. 7, the 3D re-construction section 217 includes a three-dimensional projection section 251, a pixel distribution analysis section 252, an inverse segmentation updating section 253, an inverse segmentation initial setting section 254, and an inverse normal direction estimation section 255.

The three-dimensional projection section 251 performs projection of 3D data projected to a two-dimensional plane by each region to a three-dimensional space. The pixel distribution analysis section 252 performs such a process as analysis of a pixel distribution upon projection of 3D data to a three-dimensional space by the three-dimensional projection section 251.

The inverse segmentation updating section 253 performs a process inverse to that of the segmentation updating section 153. The inverse segmentation initial setting section 254 performs a process inverse to that of the segmentation initial setting section 152. The inverse normal direction estimation section 255 performs a process inverse to that of the normal direction estimation section 151.

2. First Embodiment

<Layer Number Variation of Two-Dimensional Plane to which 3D Data is Projected>

Figure 8:
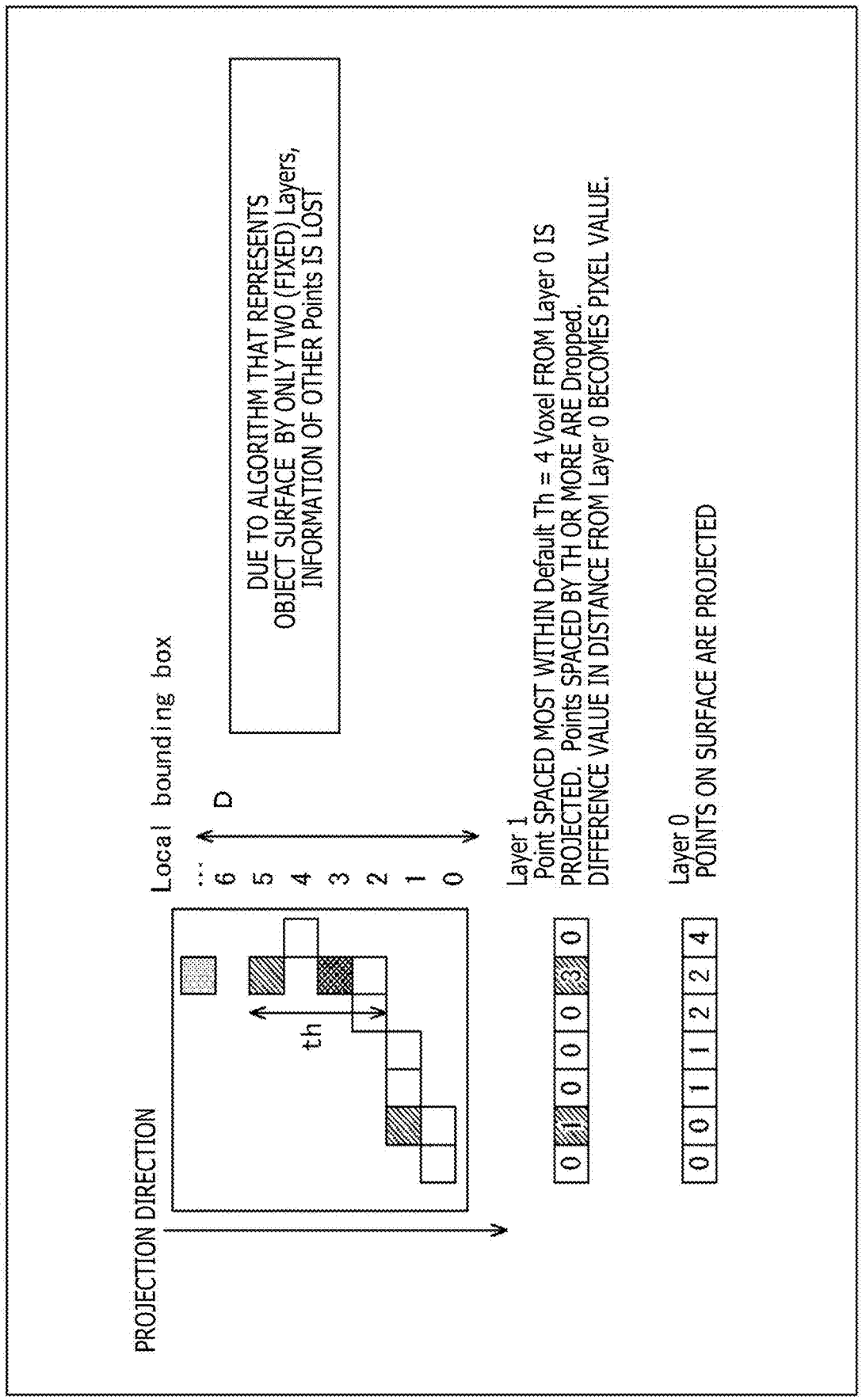
FIG. 8 is a view depicting an example of a manner of conventional two-dimensional projection.

In the conventional method, 3D data is projected to a two-dimensional plane of two layers (layer 0 and layer 1) as in an example depicted in FIG. 8.

To the layer 0 (Layer 0), pieces of data of points on the surface as viewed from a projection plane of 3D data are projected. To the layer 1 (Layer 1), data of a point spaced most from the layer 0 within a predetermined threshold value (Default Th=4 Voxels) is projected. Pieces of data of points spaced by the predetermined threshold value Th or more are dropped (Drop). It is to be noted that, in the layer 1, a difference value in distance from the layer 0 is a pixel value.

Since the algorithm represents an object surface only by two fixed layers in this manner, information of the other points is lost (cannot be reproduced). Accordingly, points that cannot be projected to a two-dimensional plane appear, and there is a possibility that the picture quality of data may be degraded by encoding that involves projection of data to a two-dimensional plane.

Thus, the layer number of the two-dimensional plane to which 3D data is to be projected may be made variable. For example, pieces of data for each of all positions included in the 3D data representative of a three-dimensional structure are projected to a two-dimensional plane of plural layers. For example, the information processing apparatus is configured such that it includes a two-dimensional projection section that projects pieces of data for each of all positions included in 3D data representative of a three-dimensional structure to a two-dimensional plane of plural layers.

Figure 9:
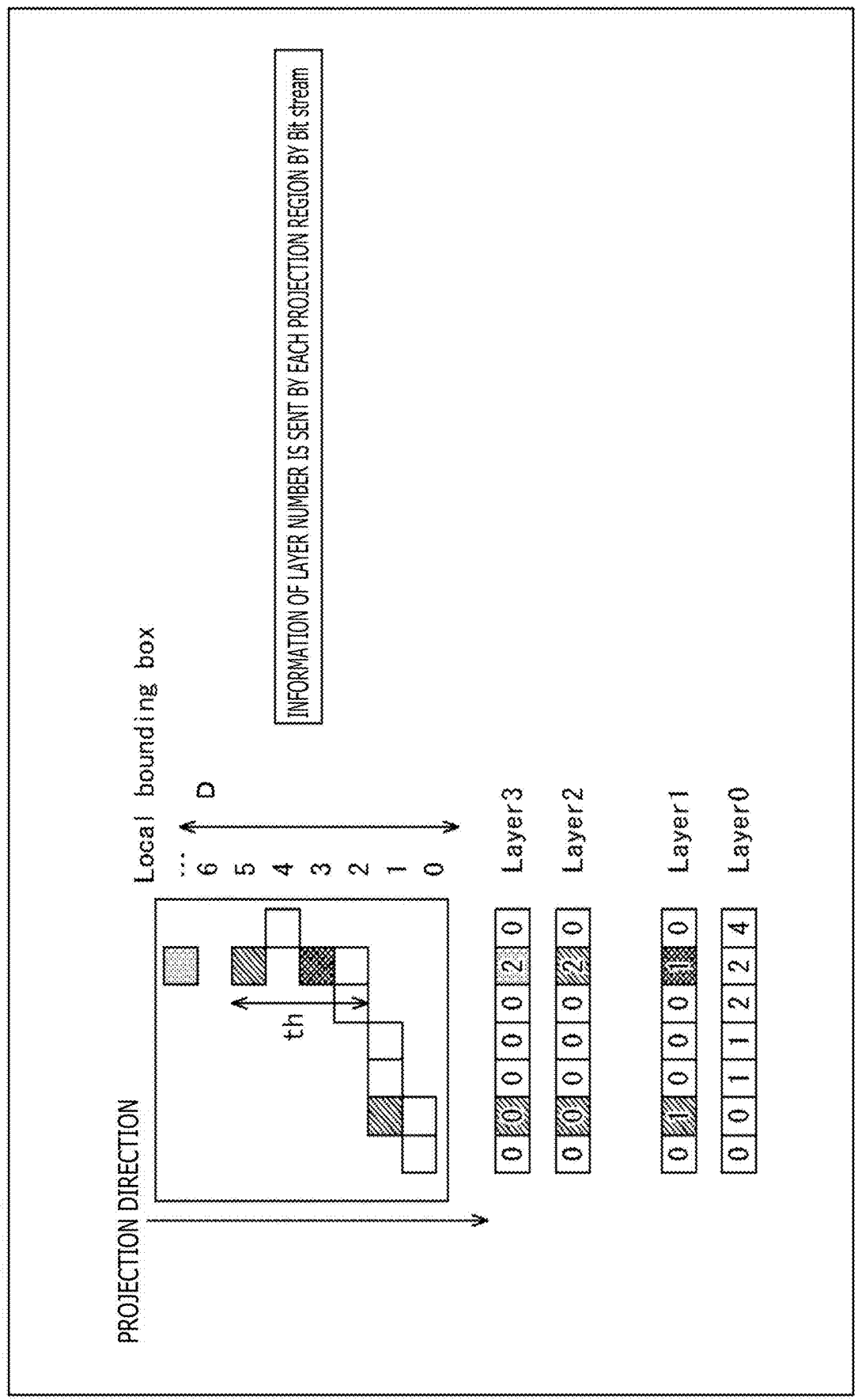
FIG. 9 is a view depicting an example of a manner of two-dimensional projection to which the present technology is applied.

For example, in the case of FIG. 9, a two-dimensional plane of a layer 0 (Layer 0) to a layer 3 (Layer 3) (a two-dimensional plane of layers more than two layers) is set, and 3D data is projected to the layers. This makes it possible to reproduce a point cloud having a thickness at the object surface with a higher degree of accuracy. In other words, degradation of the quality due to two-dimensional projection of 3D data can be suppressed.

For example, the two-dimensional projection section 154 may be configured such that it projects pieces of data for each position overlapping in position with each other in the depthwise direction as viewed from the projection plane that are included in the 3D data to layers different from each other of the two-dimensional plane of the plural layers.

In the case of the example of FIG. 9, pieces of data overlapping in the depthwise direction with each other are projected to layers different from each other among the layer 0 to the layer 3. This makes it possible to project all pieces of data for each position overlapping in position with each other in the depthwise direction as viewed from the projection plane that are included in the 3D data to the two-dimensional plane. In other words, loss of information can be suppressed. Accordingly, degradation of the picture quality due to two-dimensional projection of 3D data can be suppressed.

Further, for example, the two-dimensional projection section 154 may generate layers in a number equal to a maximum number of pieces of data for each position overlapping in position with each other in the depthwise direction as viewed from the projection plane that are included in the 3D data with respect to the two-dimensional plane.

In the case of the example of FIG. 9, the maximum number of pieces of data that overlap with each other in the depthwise direction and that are included in the 3D data in the applicable region (Local Bounding Box) is four. Accordingly, the 3D data is projected to a two-dimensional plane of four layers (layer 0 to layer 3).

This makes it possible to project all pieces of data for each position of the 3D data to be projected to the two-dimensional plane. Accordingly, since loss of information can be suppressed, degradation of the quality due to two-dimensional projection of 3D data can be suppressed.

It is to be noted that, in this case, information indicative of the layer number of the two-dimensional plane to which 3D data is projected by the two-dimensional projection section 154 may be signaled by a bit stream. In particular, the multiplexer 117 that functions as a bit stream generation unit generates a bit stream that includes information indicative of the layer number of the two-dimensional plane to which 3D data is projected by the two-dimensional projection section 154 and encoded data obtained by encoding of the two-dimensional plane by the video encoding section 114 or the like.

This makes it possible for the decoding side to easily project 3D data projected to all the layers of the two-dimensional plane to a three-dimensional space by referring to the information indicative of the layer number of the two-dimensional plane.

<Flow of Encoding Process>

An example of a flow of an encoding process executed by the encoding apparatus 100 is described with reference to a flow chart of FIG. 10.

After the encoding process is started, the patch decomposition section 111 of the encoding apparatus 100 decomposes 3D data into patches and projects pieces of data of the patches to a two-dimensional plane in step S101. In step S102, the auxiliary patch information compression section 113 compresses auxiliary patch information obtained by the process in step S101.

In step S103, the packing section 112 performs packing of the 3D data projected by each patch to the two-dimensional plane by the patch decomposition section 111 into video frames. In step S104, the video encoding section 114 encodes geometry video frames that are the video frames of the position information obtained by the process in step S103, by an encoding method for a two-dimensional image.

In step S105, the video encoding section 114 encodes a color video frame that is a video frame of attribute information obtained by the process in step S103, by an encoding method for a two-dimensional image. In step S106, the video encoding section 114 encodes an occupancy map obtained by the process in step S103, by an encoding method for a two-dimensional image.

In step S107, the multiplexer 117 multiplexes the various kinds of information generated in such a manner as described above to generate a bit stream including the information.

In step S108, the multiplexer 117 outputs the bit stream generated by the process in step S107 to the outside of the encoding apparatus 100.

When the process in step S108 ends, the encoding process ends.

<Flow of Patch Decomposition Process>

Figure 10:
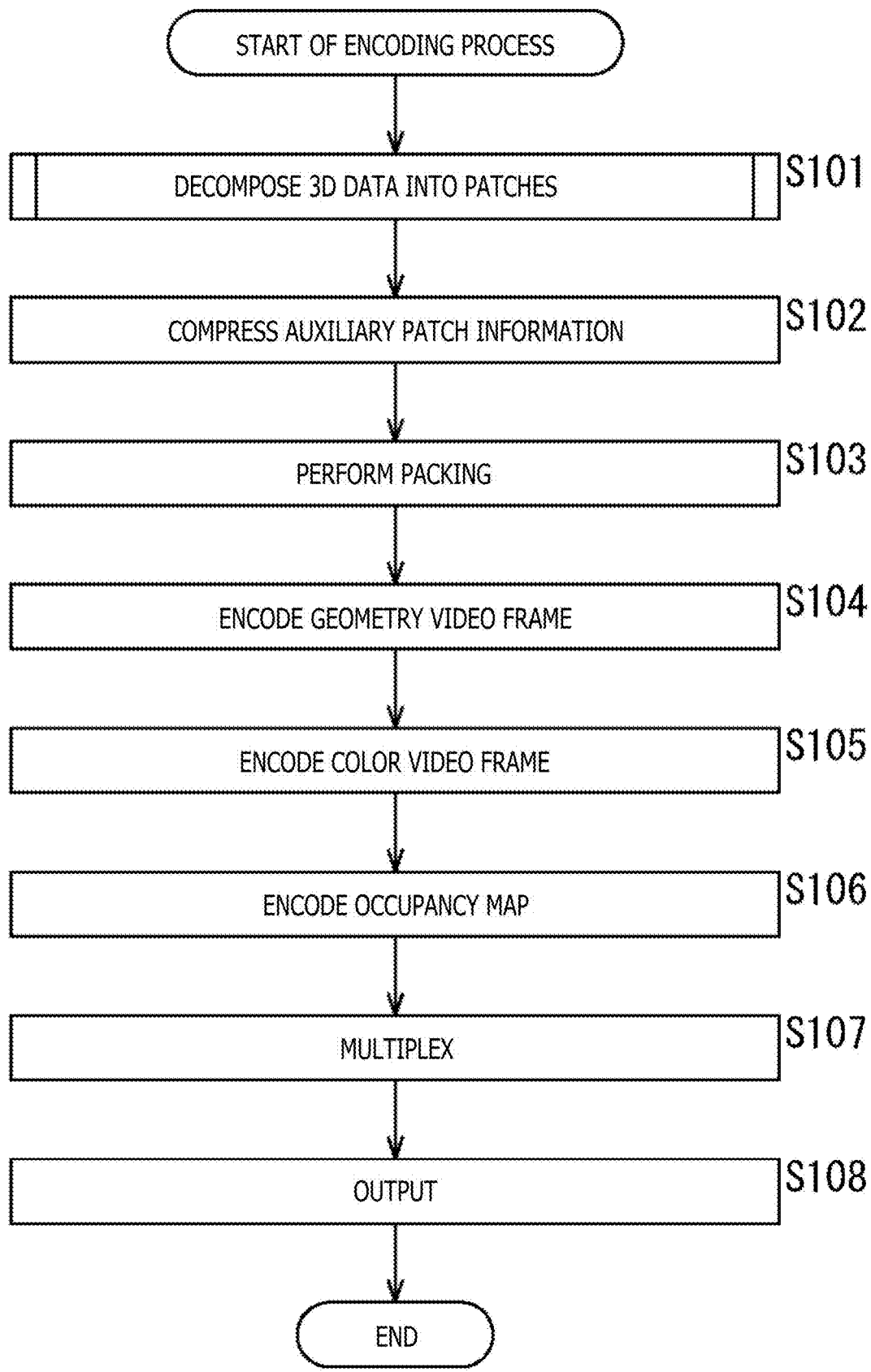
FIG. 10 is a flow chart illustrating an example of a flow of an encoding process.

Now, an example of a flow of the patch decomposition process executed in step S101 of FIG. 10 is described with reference to a flow chart of FIG. 11.

After the patch decomposition process is started, the normal direction estimation section 151 estimates a normal direction in step S121. Then, in step S122, the segmentation initial setting section 152 performs initial setting for segmentation. In step S123, the segmentation updating section 153 updates the segmentation in the initial state set in step S122 as occasion demands. In step S124, the two-dimensional projection section 154 projects 3D data to a two-dimensional plane.

When the process in step S124 ends, the patch decomposition process ends, and the processing returns to FIG. 10.

<Flow of Two-Dimensional Projection Process>

Figure 11:
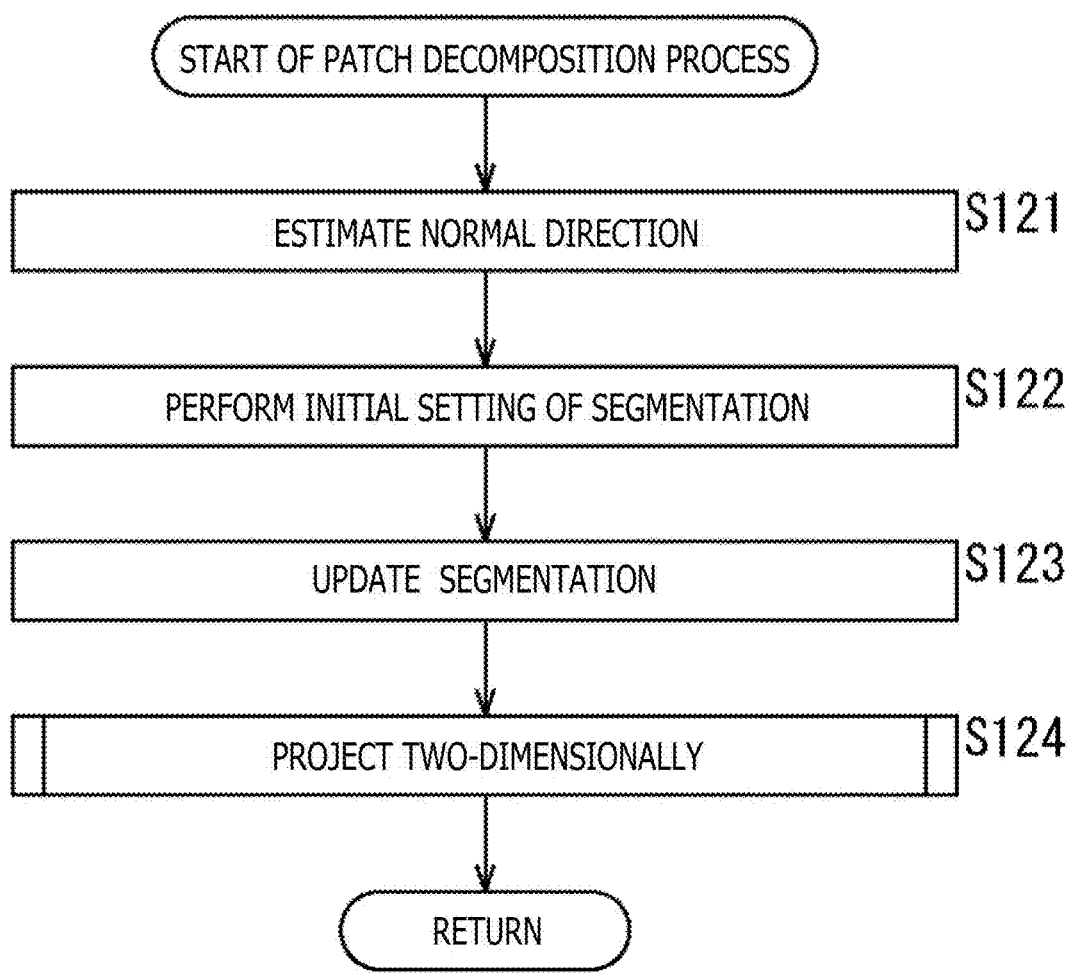
FIG. 11 is a flow chart illustrating an example of a flow of a patch decomposition process.
Figure 12:
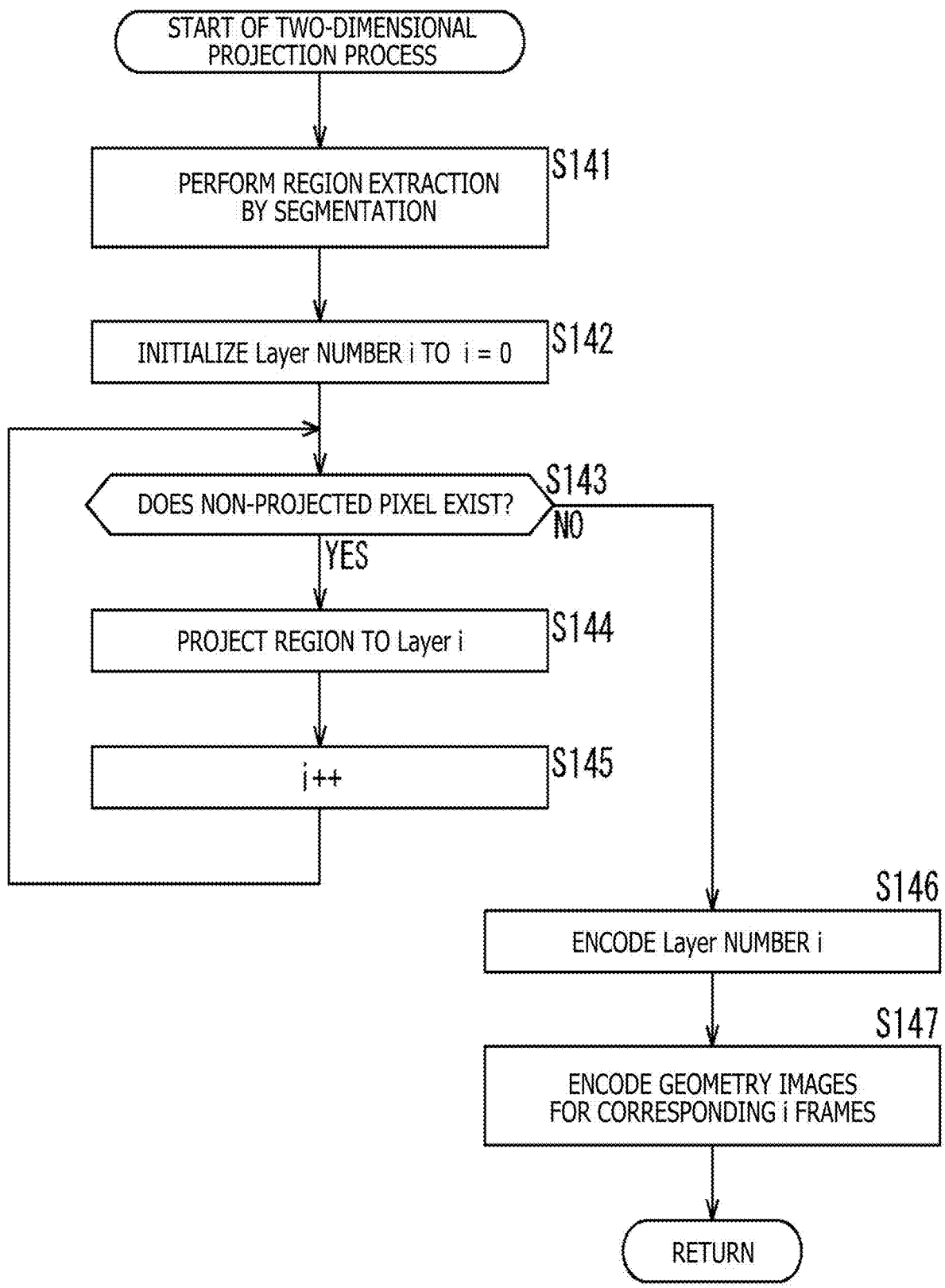
FIG. 12 is a flow chart illustrating an example of a flow of a two-dimensional projection process.

Now, an example of a flow of the two-dimensional projection process executed in step S124 of FIG. 11 is described with reference to a flow chart of FIG. 12.

After the two-dimensional projection process is started, the two-dimensional projection section 154 performs region extraction by segmentation in step S141. In step S142, the two-dimensional projection section 154 initializes the layer (Layer) number i to i=0.

In step S143, the pixel distribution analysis section 155 determines whether or not a non-projected pixel (pieces of data for each position of the 3D data that have not yet been projected to the two-dimensional plane) exists. In the case where it is determined that a non-projected pixel exists, the processing advances to step S144.

In step S144, the two-dimensional projection section 154 projects the region to the layer i (Layer i) of the processing target. In step S145, the two-dimensional projection section 154 increments the variable i (i++). After the process in step S145 ends, the processing returns to step S143 to repeat the processes beginning with step S143.

In the case where it is determined in step S143 that a non-projected pixel does not exist (all pixels in the region have been projected), the processing advances to step S146.

In step S146, the two-dimensional projection section 154 supplies information indicative of the layer number i so as to be encoded. Further, in step S147, the two-dimensional projection section 154 causes a geometry image for the corresponding i frame to be encoded. In particular, the two-dimensional projection section 154 supplies a two-dimensional plane to which the 3D data is to be projected to the packing section 112 such that the layers of the two-dimensional plane are packed into frames different from each other.

When the process in step S147 ends, the two-dimensional projection process ends, and the processing returns to FIG. 11.

By executing the processes in such a manner as described above, a point cloud having a thickness at the object surface can be reproduced with a higher degree of accuracy. In short, degradation of the quality due to two-dimensional projection of 3D data can be suppressed.

<Re-Construction of 3D Data Projected to Two-Dimensional Plane Having Variable Layer Number>

On the decoding side, by using information indicative of a layer number of a two-dimensional plane supplied from the encoding side, re-construction of 3D data projected to a two-dimensional plane whose layer number is variable as described above can be implemented.

In particular, all pieces of data for each position of 3D data projected to a two-dimensional plane having a layer number indicated by layer number information are projected to a three-dimensional space. For example, the image processing apparatus is provided with a three-dimensional projection section that projects all pieces of data for each position of 3D data projected to a two-dimensional plane having a layer number indicated by layer number information to a three-dimensional space.

This makes it possible to implement re-construction of 3D data projected to a two-dimensional plane having a variable layer number. In particular, a point cloud having a thickness at the object surface can be reproduced with a higher degree of accuracy. In other words, degradation of the quality due to two-dimensional projection of 3D data can be suppressed.

<Flow of Decoding Process>

An example of a flow of a decoding process executed by the decoding apparatus 200 is described with reference to a flow chart of FIG. 13.

After the decoding process is started, the demultiplexer 211 of the decoding apparatus 200 demultiplexes a bit stream in step S201.

In step S202, the auxiliary patch information decoding section 212 decodes auxiliary patch information extracted from the bit stream by the process in step S201. In step S203, the video decoding section 213 decodes encoded data of a geometry video frame (video frame of position information) extracted from the bit stream by the process in step S201.

In step S204, the video decoding section 214 decodes encoded data of a color video frame (video frame of attribute information) extracted from the bit stream by the process in step S201. In step S205, the O Map decoding section 215 decodes encoded data of an occupancy map extracted from the bit stream by the process in step S201.

In step S206, the unpacking section 216 performs unpacking of the geometry video frame, color video frame, and occupancy map decoded in step S203 to step S205.

In step S207, the 3D re-construction section 217 re-constructs 3D data, for example, of a point cloud on the basis of the auxiliary patch information obtained in step S202 and the various kinds of information obtained in step S206.

When the process in step S207 ends, the decoding process ends.

<Flow of Point Cloud Re-Construction Process>

Figure 13:
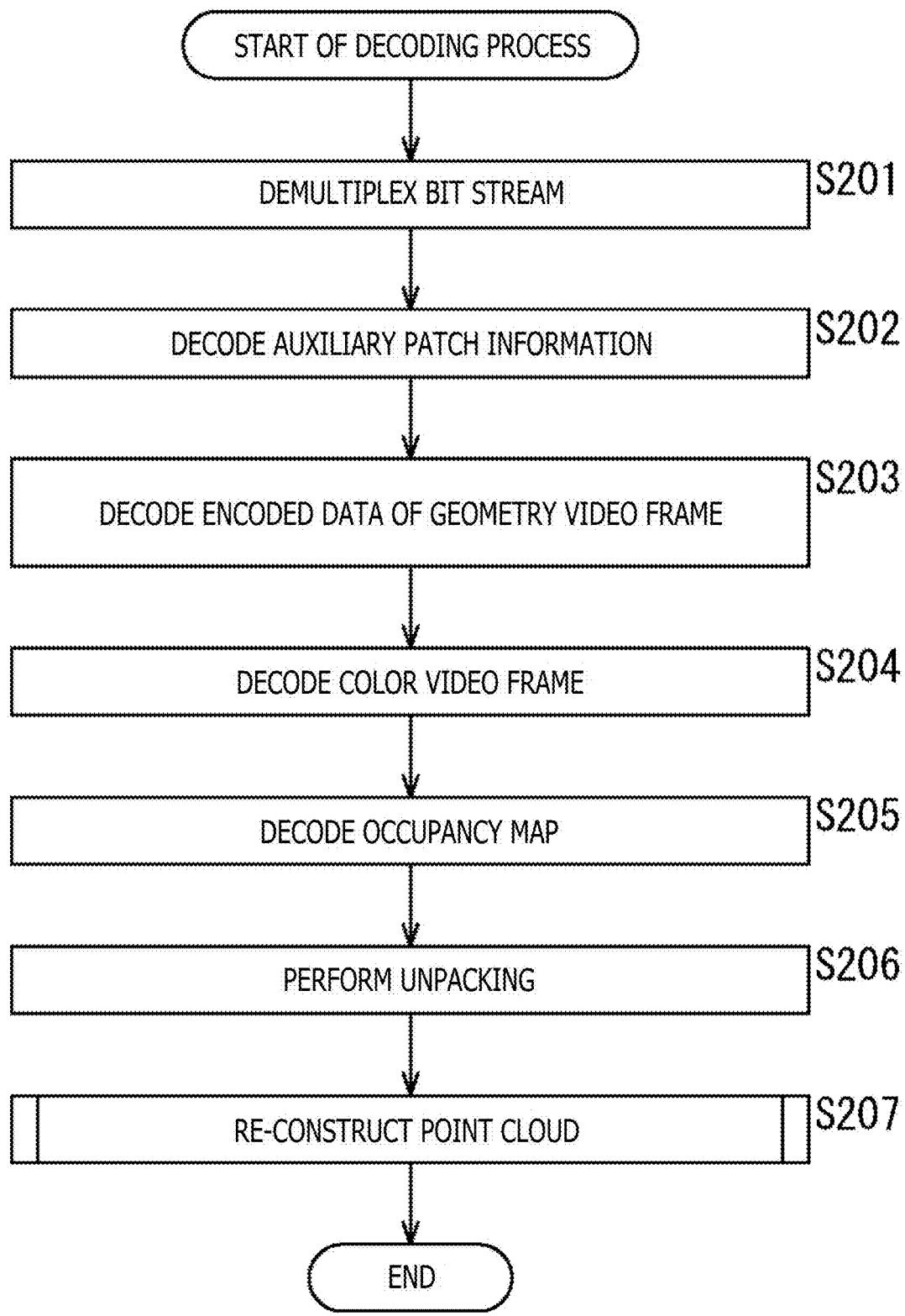
FIG. 13 is a flow chart illustrating an example of a flow of a decoding process.

Now, an example of a flow of the point cloud re-construction process executed in step S207 of FIG. 13 is described with reference to a flow chart of FIG. 14.

After the point cloud re-construction process is started, the three-dimensional projection unit 251 projects a two-dimensional image to a three-dimensional space in step S221.

In step S222, the inverse segmentation updating section 253 updates the segmentation to a reverse direction and divides the segmentations put together.

In step S223, the inverse segmentation initial setting section 254 performs a process inverse to the initial setting of segmentation and puts together the classified points.

In step S224, the inverse normal direction estimation section 255 performs a process inverse to the normal direction estimation to re-construct a point cloud.

When the process in step S224 ends, the point cloud re-construction process ends, and the processing returns to FIG. 13.

<Flow of Three-Dimensional Projection Process>

Figure 14:
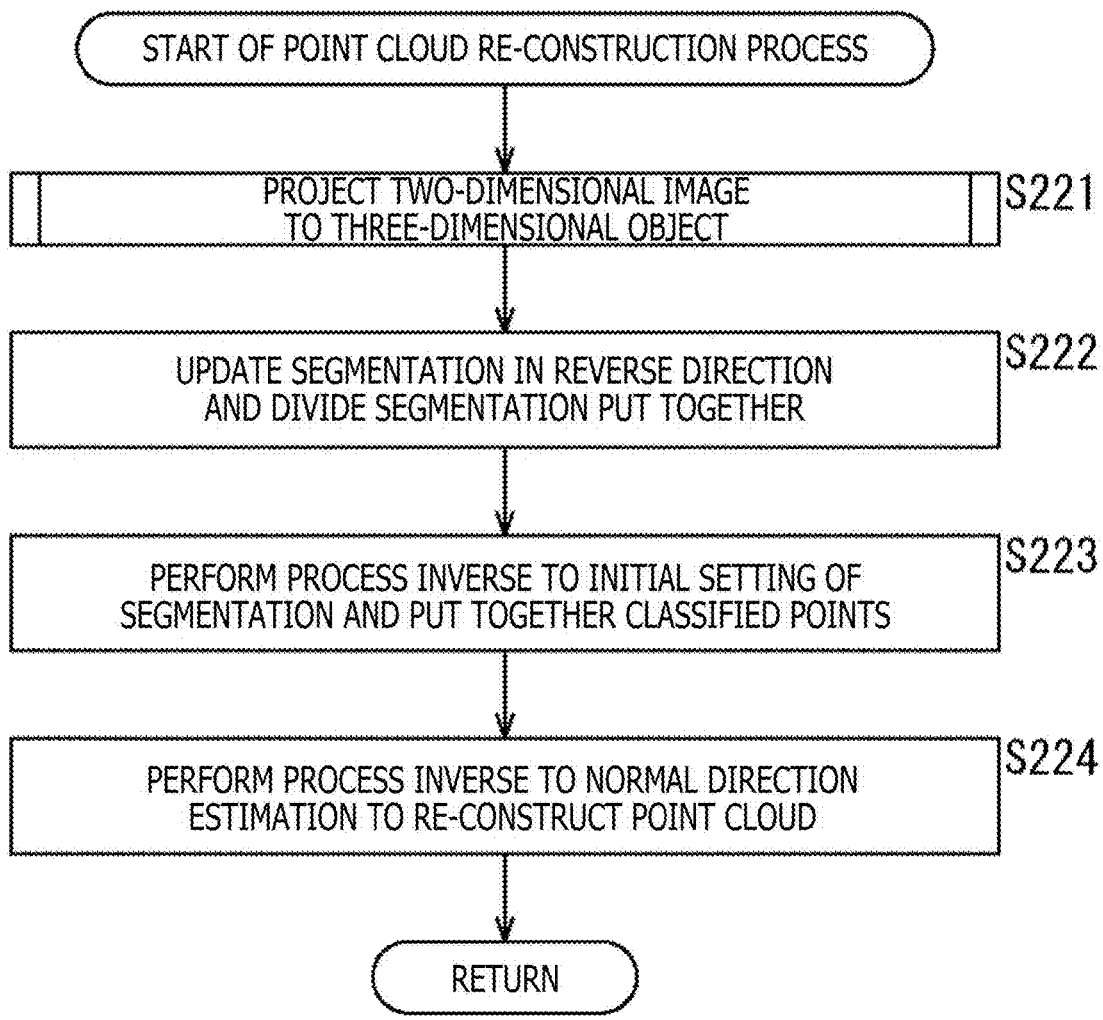
FIG. 14 is a flow chart illustrating an example of a flow of a point cloud re-construction process.
Figure 15:
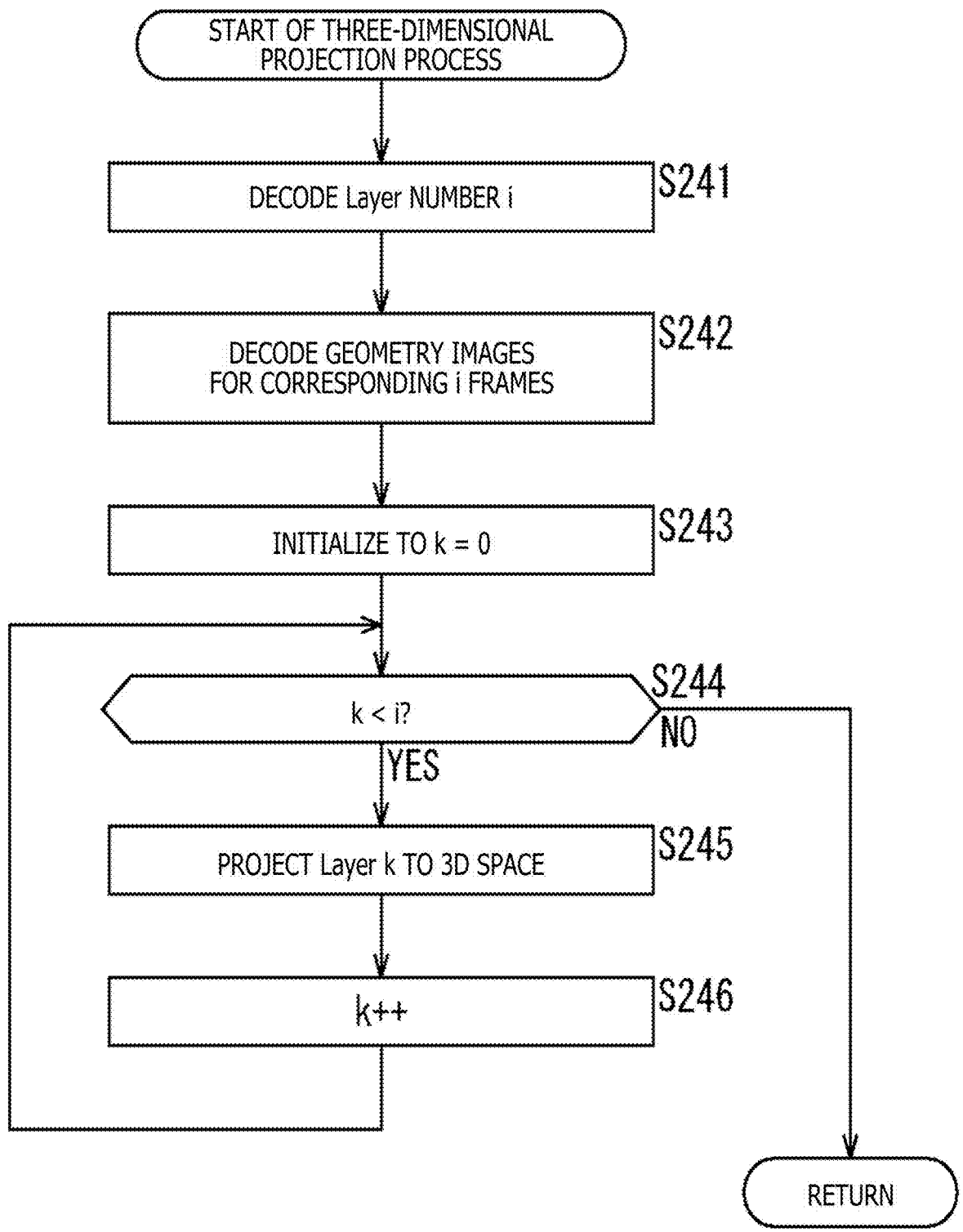
FIG. 15 is a flow chart illustrating an example of a flow of a three-dimensional projection process.

Now, an example of a flow of the three-dimensional projection process executed in step S221 of FIG. 14 is described with reference to a flow chart of FIG. 15.

After the three-dimensional projection process is started, the three-dimensional projection section 251 causes information indicative of the layer number i to be decoded in step S241.

In step S242, the three-dimensional projection section 251 causes a geometry image for the corresponding i frames to be decoded.

In step S243, the pixel distribution analysis section 252 initializes the variable k to k=0.

In step S244, the pixel distribution analysis section 252 determines whether or not the variable k is k<i. In the case where it is determined that k<i holds, the processing advances to step S245.

In step S245, the three-dimensional projection section 251 projects 3D data of the layer k (Layer k) to a three-dimensional space.

In step S246, the pixel distribution analysis section 252 increments the variable k (k++).

After the process in step S246 ends, the processing returns to step S244.

On the other hand, in the case where it is decided in step S244 that the variable k is not k<i, the three-dimensional projection process ends, and the processing returns to FIG. 14.

By executing the processes in such a manner as described above, re-construction of 3D data projected to a two-dimensional plane whose layer number is variable can be implemented. In short, a point cloud having a thickness at the object surface can be reproduced with a higher degree of accuracy. In other words, degradation of the quality due to two-dimensional projection of 3D data can be suppressed.

3. Second Embodiment

<Signal of Value Indicative of "Absent Pixel">

If sparse (Sparse) 3D data is projected to a two-dimensional image, then a pixel whose 3D data is not projected to the two-dimensional image, i.e., a pixel for which no pixel value is set (hereinafter also referred to as an absent pixel), sometimes appears.

Figure 16:
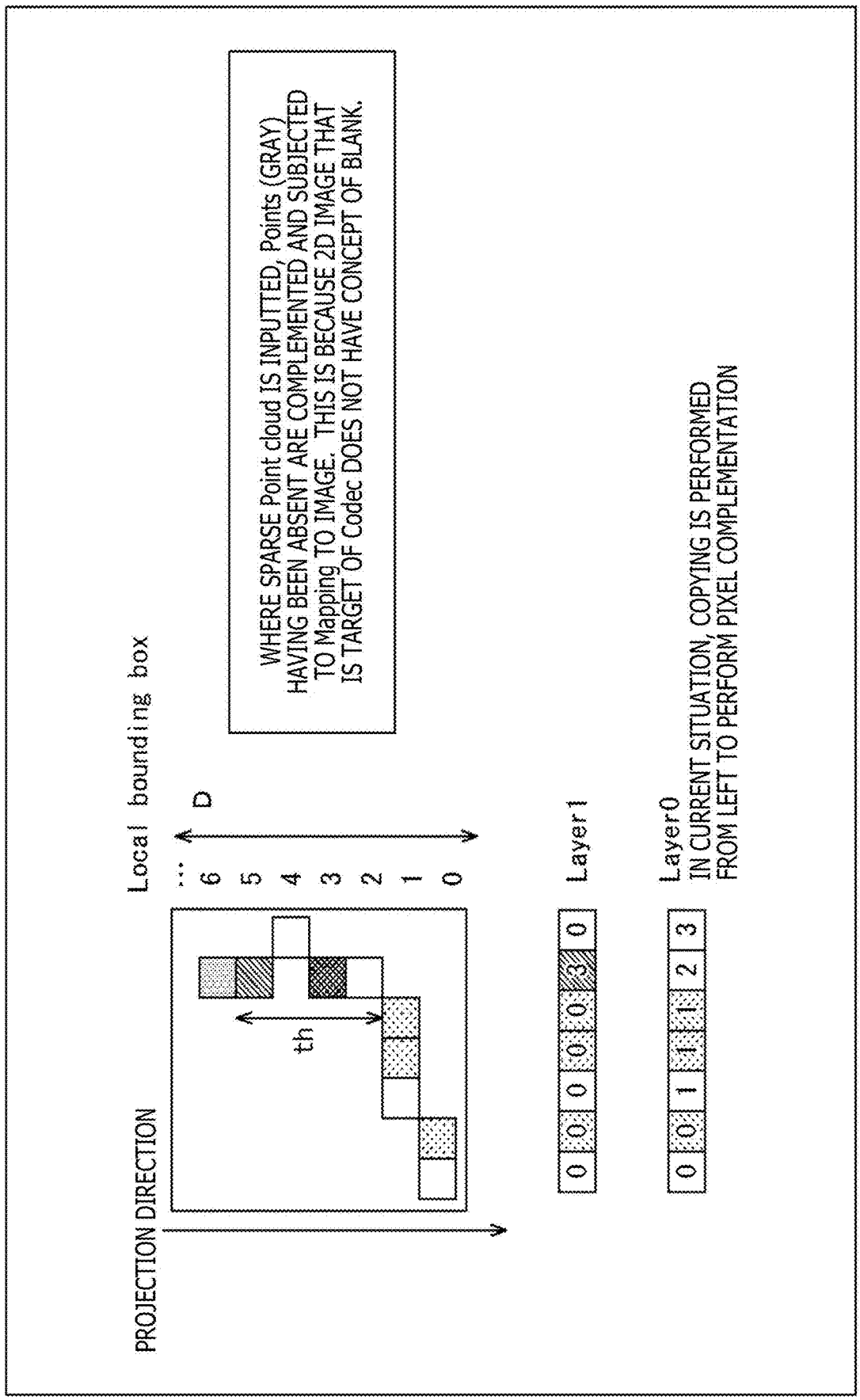
FIG. 16 is a view depicting an example of a manner of conventional two-dimensional projection.

In the conventional method, in the case where 3D data is sparse (Sparse), a pixel value is complemented for such an "absent pixel" as described above, for example, as depicted in FIG. 16. For example, in the case of FIG. 16, for an "absent pixel" of the layer 0 (Layer 0), a pixel value is copied from a pixel on the left of the "absent pixel" (pixel complementation is performed). The reason why such a complementation process as just described is performed is that the encoding method for a two-dimensional image (for example, AVC or HEVC) does not have a concept that data does not exist (blank).

However, if such a complementation process is performed, then this adds a point that does not originally exist to 3D data. Therefore, there is a possibility that the 3D data may be deteriorated. In other words, there is a possibility that the quality may be degraded due to two-dimensional projection of the 3D data.

It is to be noted that, in the case where such a complementation process as described above is not performed, it is necessary to set regions such that an "absent pixel" does not appear on a two-dimensional plane to which 3D data is to be projected. Therefore, projection in a unit of a very small region (Point) is required, and there is a possibility for the processing amount to increase or the encoding efficiency to be decreased.

Therefore, pieces of data for each position included in 3D data representative of a three-dimensional structure are projected to a two-dimensional plane, and a predetermined value indicating that data for each position does not exist is set for a position of the two-dimensional plane at which data for each position does not exist. For example, the image processing apparatus is provided with a two-dimensional projection section that projects pieces of data for each position included in 3D data representative of a three-dimensional structure to a two-dimensional plane and sets, for a position of the two-dimensional plane at which data for each position does not exist, a predetermined value indicating that data for each position does not exist.

Figure 17:
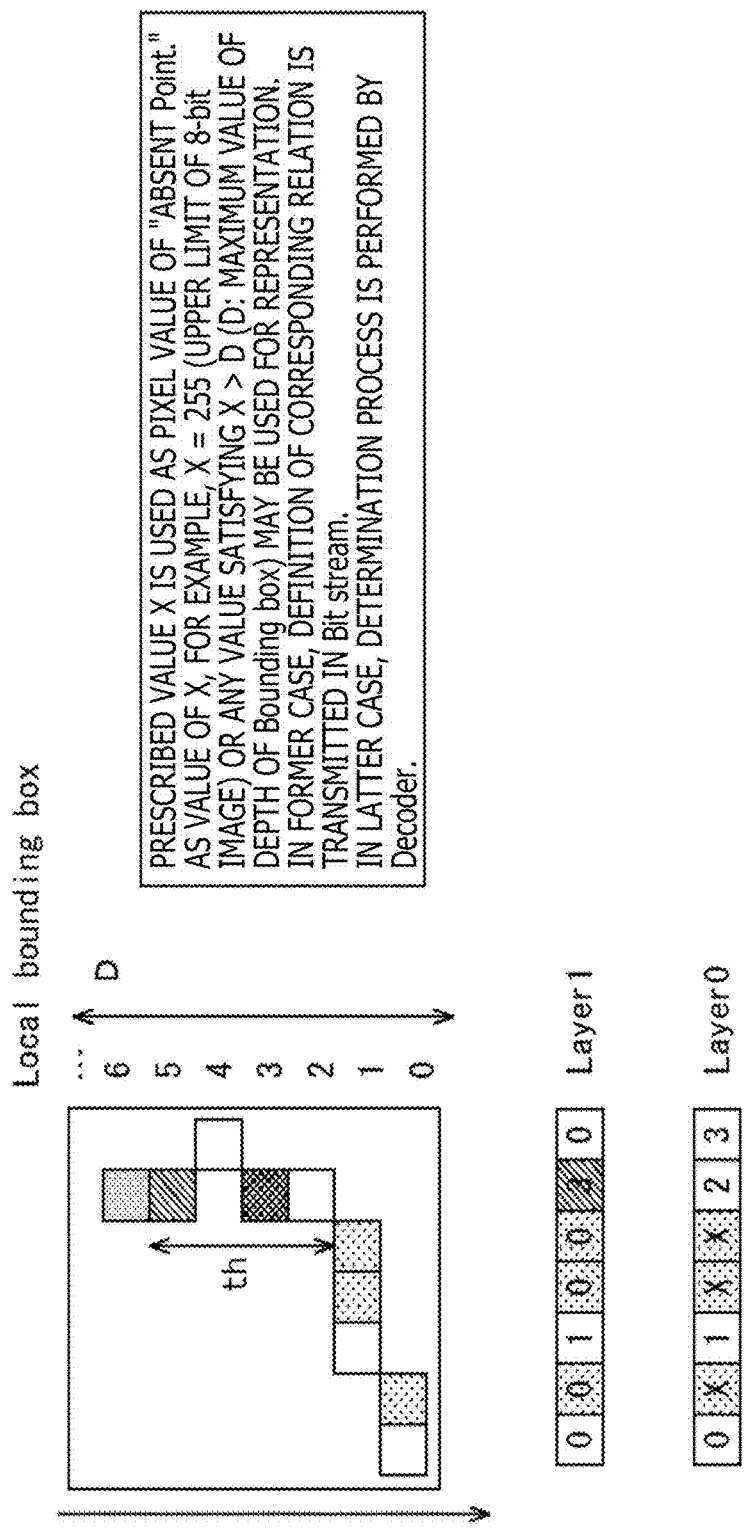
FIG. 17 is a view depicting an example of a manner of two-dimensional projection to which the present technology is applied.

For example, as a pixel value indicative of an "absent pixel" on a two-dimensional plane to which 3D data is to be projected, a prescribed value X is used, as depicted in FIG. 17. This value of X may be, for example, a given fixed value determined in advance. For example, X may be X=255 (upper limit of 8 bits).

In this case, it is necessary to signal the value of X in a bit stream (it is necessary to notify the decoding side of this).

Further, for example, as the value of X, any value satisfying X>D may be used. Here, D indicates a maximum value of the depth of the relevant bounding box. A value equal to or greater than the maximum value of the depth of the bounding box cannot be set to any pixel value of a two-dimensional plane. Accordingly, such an unused value may be used as X.

In this case, the decoding side can determine from information relating to the size of the bounding box whether or not a pixel value set to the two-dimensional plane is an unused value. Accordingly, there is no necessity to signal this value of X in a bit stream (in short, there is no necessity to notify the decoding side of this value of X). However, the value of X may naturally be notified to the decoding side.

This makes it possible for the encoding apparatus 100 to suppress deterioration of 3D data because the encoding apparatus 100 can represent an "absent pixel" without the need for complementation of data. In short, degradation of the quality due to two-dimensional projection of 3D data can be suppressed.

Further, since this makes it possible for the encoding apparatus 100 to decrease the number of "pixels that cannot be encoded" in the two-dimensional plane, the region can be set larger in comparison with an alternative case in which a complementation process is simply not performed. Accordingly, projection in a unit of a very small region (Point) becomes unnecessary, and increase of the processing amount and decrease of the encoding efficiency can be suppressed.

<Flow of Two-Dimensional Projection Process>

Also in this case, the encoding process and the patch decomposition process are performed similarly as in the case described hereinabove in connection with the first embodiment. Accordingly, description of them is omitted.

Figure 18:
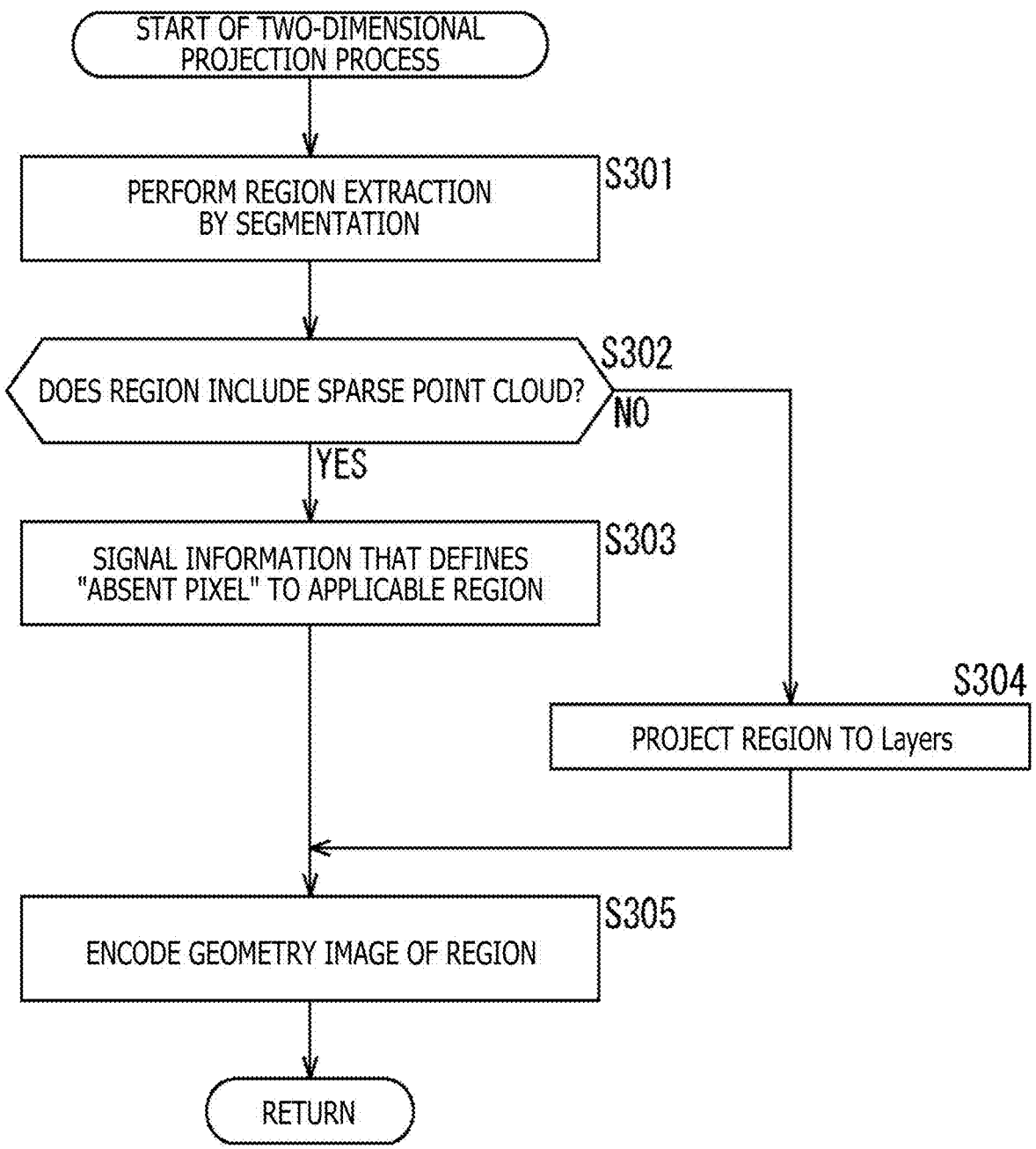
FIG. 18 is a flow chart illustrating an example of a flow of a two-dimensional projection process.

An example of a flow of the two-dimensional projection process in this case executed in step S214 of FIG. 11 is described with reference to a flow chart of FIG. 18.

After the two-dimensional projection process is started, the two-dimensional projection section 154 performs region extraction by segmentation in step S301. In step S302, the pixel distribution analysis section 155 determines whether or not the region includes a sparse point cloud. In the case where it is determined that the region includes a sparse point cloud, the processing advances to step S303.

In step S303, the two-dimensional projection section 154 signals information defining an "absent pixel" in regard to the region. In other words, the two-dimensional projection section 154 sets X described hereinabove and uses this X to represent an "absent point" projected to the two-dimensional plane. After the process in step S303 ends, the processing advances to step S305.

On the other hand, in the case where it is determined in step S302 that the region does not include a sparse point cloud, the processing advances to step S304.

In step S304, the two-dimensional projection section 154 projects the region to the layers of the two-dimensional plane. After the process in step S304 ends, the processing advances to step S305.

In step S305, the two-dimensional projection section 154 causes a geometry image of the region to be encoded.

After the process in step S305 ends, the two-dimensional projection process ends, and the processing returns to FIG. 11.

By performing a two-dimensional projection process in such a manner as described above, the encoding apparatus 100 can represent an "absent pixel" without the need for complementation of data. Accordingly, deterioration of 3D data can be suppressed. In other words, degradation of the quality due to two-dimensional projection of 3D data can be suppressed.

Further, since this makes it possible for the encoding apparatus 100 to decrease the number of "pixels that cannot be encoded" in the two-dimensional plane, the region can be set larger in comparison with an alternative case in which a complementation process is simply not performed. Accordingly, projection in a unit of a very small region (Point) becomes unnecessary, and increase of the processing amount and decrease of the encoding efficiency can be suppressed.

<Use of Value Indicative of Signaled "Absent Pixel">

When the decoding side projects 3D data projected to a two-dimensional plane to a three-dimensional space, it detects a pixel value indicative of an "absent pixel" (X described above) on the two-dimensional plane signaled in such a manner as described above and deletes the same (so as not to be projected).

In particular, data other than data of the predetermined value indicating that data for each position does not exist, among pieces of data for each position included in 3D data representative of a three-dimensional structure projected to a two-dimensional plane, is projected to a three-dimensional space. For example, the image processing apparatus is provided with a three-dimensional projection section that projects, to a three-dimensional space, data other than data of the predetermined value indicating that data for each position does not exist, among pieces of data for each position included in 3D data representative of a three-dimensional structure projected to a two-dimensional plane, is projected.

Since this makes it possible to represent an "absent pixel" without the need for complementation of data, deterioration of 3D data can be suppressed. In short, degradation of the quality due to two-dimensional projection of 3D data can be suppressed.

Further, since this makes it possible to decrease the number of "pixels that cannot be encoded" in the two-dimensional plane, the region can be set larger in comparison with an alternative case in which a complementation process is simply not performed. Accordingly, projection in a unit of a very small region (Point) becomes unnecessary, and increase of the processing amount and decrease of the encoding efficiency can be suppressed.

<Flow of Three-Dimensional Projection Process>

Also in this case, the decoding process and the point cloud re-construction process are performed similarly as in the case described hereinabove in connection with the first embodiment. Accordingly, description of them is omitted.

Figure 19:
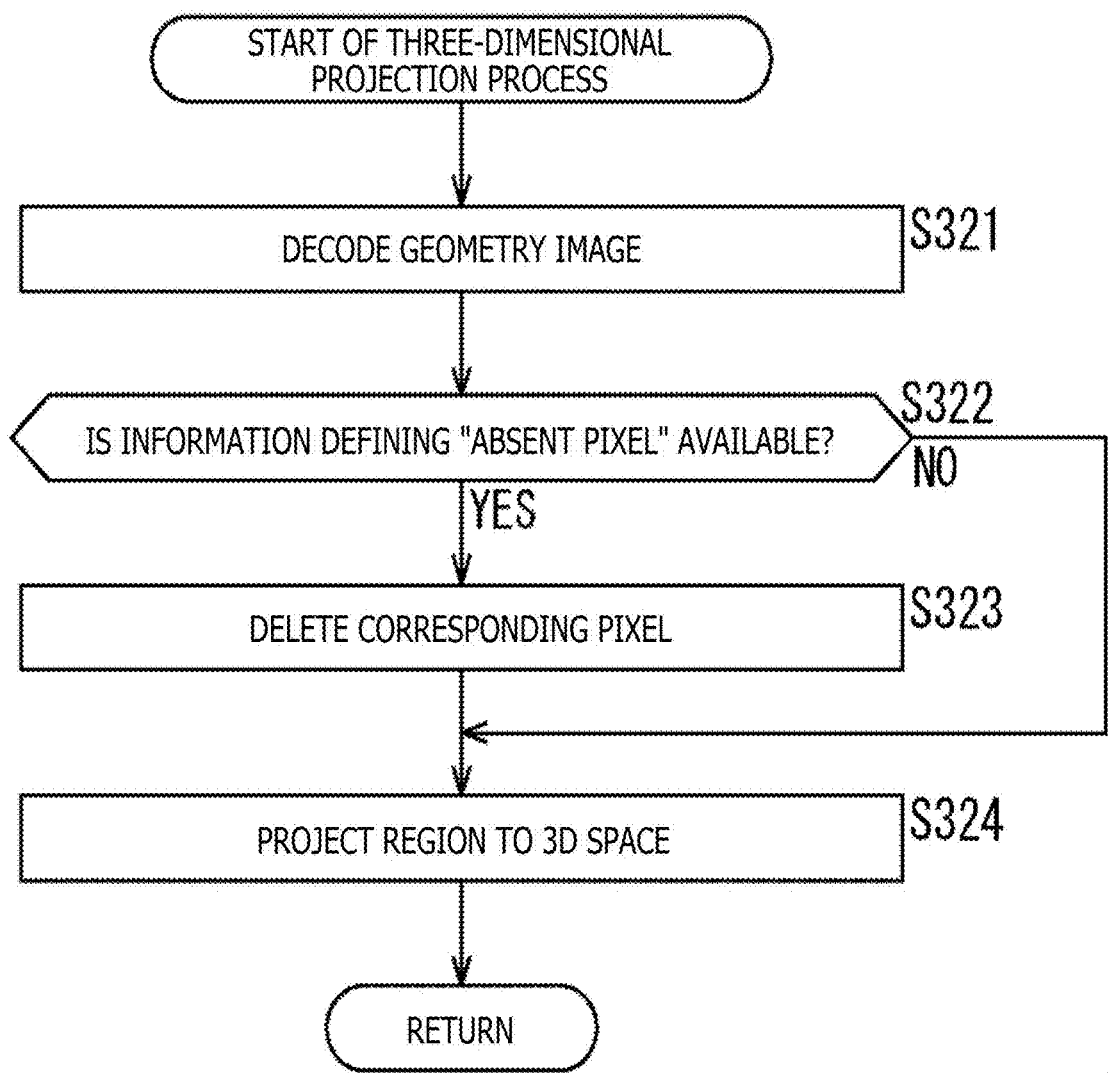
FIG. 19 is a flow chart illustrating an example of a flow of a three-dimensional projection process.

An example of a flow of the three-dimensional projection process in this case executed in step S221 of FIG. 14 is described with reference to a flow chart of FIG. 19.

After the three-dimensional projection process is started, the three-dimensional projection section 251 decodes a geometry image of a region of a processing target in step S321.

In step S322, the pixel distribution analysis section 252 determines whether or not information defining an "absent pixel" (pixel value indicative of an "absent pixel") exists in the geometry image. In the case where it is determined that such information exists, the processing advances to step S323.

In step S323, the three-dimensional projection section 251 deletes pixels of the pixel value indicative of the "absent pixel" detected (sets them so as not to be projected to the three-dimensional space). After the process in step S323 ends, the processing advances to step S324.

On the other hand, in the case where it is determined in step S322 that a pixel value indicative of an "absent pixel" does not exist, the process in step S323 is omitted, and the processing advances to step S324.

In short, detection of a pixel value indicative of an "absent pixel" is performed for the geometry image of the region of the processing target, and if such a pixel value is detected, then the pixel is deleted.

In step S324, the three-dimensional projection section 251 projects the geometry image of the region of the processing target to the three-dimensional space.

After the process in step S324 ends, the three-dimensional projection process ends, and the processing returns to FIG. 14.

By executing the three-dimensional projection process in such a manner as described above, the decoding apparatus 200 can represent an "absent pixel" without the need for complementation of data, and therefore, deterioration of 3D data can be suppressed. In other words, degradation of the quality due to two-dimensional projection of 3D data can be suppressed.

Further, since this makes it possible for the decoding apparatus 200 to decrease the number of "pixels that cannot be encoded" in the two-dimensional plane, the region can be set larger in comparison with an alternative case in which a complementation process is simply not performed. Accordingly, projection in a unit of a very small region (Point) becomes unnecessary, and increase of the processing amount and decrease of the encoding efficiency can be suppressed.

4. Third Embodiment

<Control of Depth Parameter>

When 3D data is projected to a two-dimensional plane, a depth parameter th for controlling the range in the depthwise direction of 3D data to be projected to the two-dimensional plane is used. Since points in a range designated by this depth parameter th becomes a projection target of the two-dimensional plane, the value of the depth parameter th has a relation to the length in the depthwise direction of the region (Local bounding box). For example, if the value of the depth parameter th is greater than the length in the depthwise direction of the region, then a point in a different region can also become a projection target. In short, there is a need to make the length of the region in the depthwise direction greater than the depth parameter th.

Figure 20:
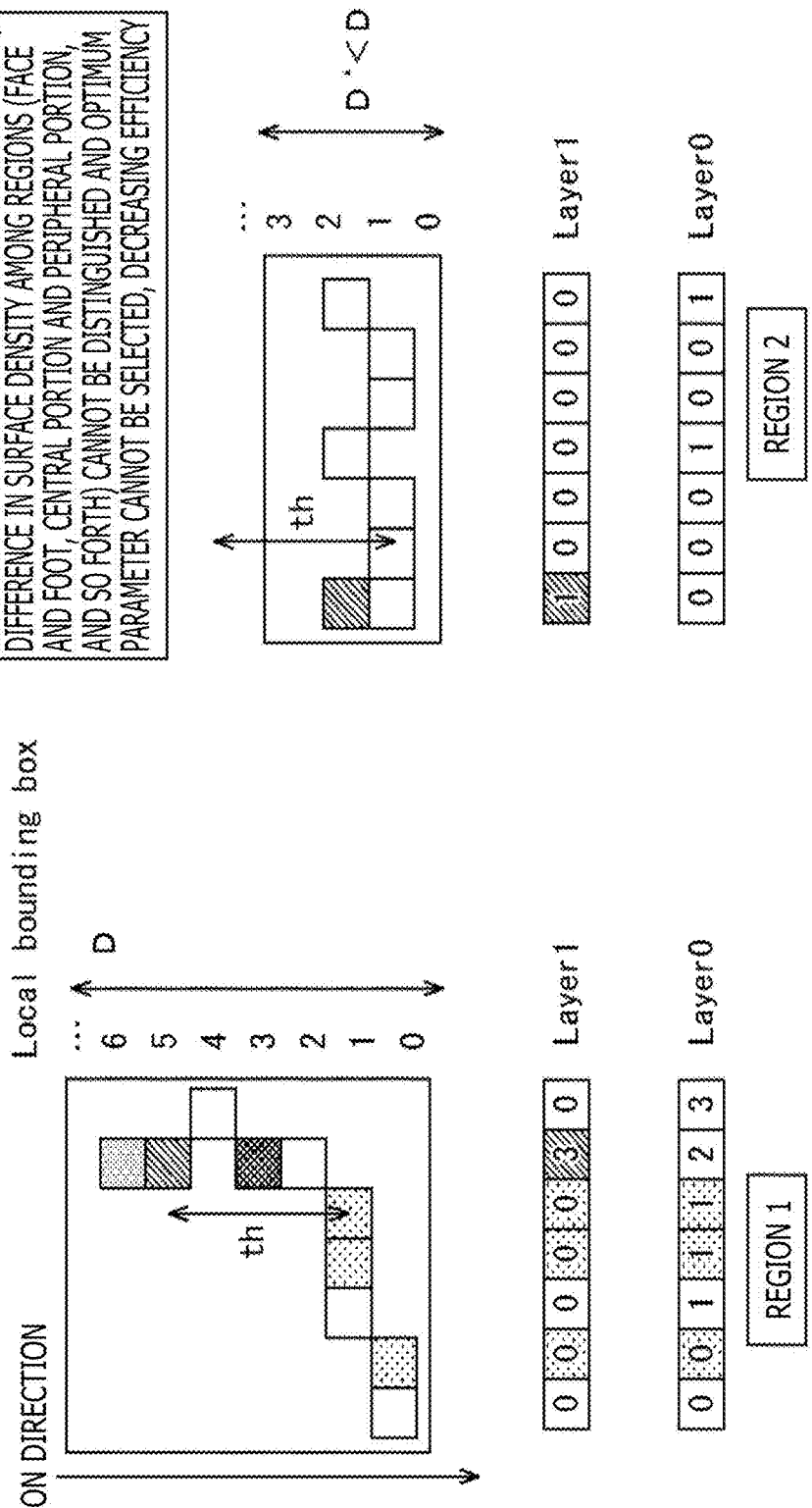
FIG. 20 is a view depicting an example of a manner of conventional two-dimensional projection.

In the conventional method, this depth parameter th is controlled in a unit of a frame as depicted in FIG. 20. Accordingly, all depth parameters th in a frame have a common value.

However, a case in which the surface density of a point cloud is not fixed in a frame such as, for example, between the face and the feet or between a central portion and a peripheral port, may possibly occur. Therefore, there is a possibility that the value of the depth parameter th may not always be optimum and the encoding efficiency may be decreased. For example, a case in which, despite that division of a region in the depthwise direction results in higher encoding efficiency, the value of the depth parameter th is so high that the region cannot be divided possibly occurs.

Therefore, when data for each position of 3D data representative of a three-dimensional structure is projected to a two-dimensional plane by each predetermined region of a three-dimensional space, data for each position within the range in the depthwise direction indicated by the depth parameter restricting the range in the depthwise direction of data for each position of 3D data representative of a three-dimensional structure that can be projected to one layer set for each region is projected to the two-dimensional plane. For example, the image processing apparatus is provided with a two-dimensional projection section for projecting, when data for each position of 3D data representative of a three-dimensional structure is projected to a two-dimensional plane by each predetermined region of a three-dimensional space, data for each position within the range in the depthwise direction indicated by the depth parameter restricting the range in the depthwise direction of data for each position of 3D data representative of a three-dimensional structure that can be projected to one layer set for each region, to the two-dimensional plane.

Figure 21:
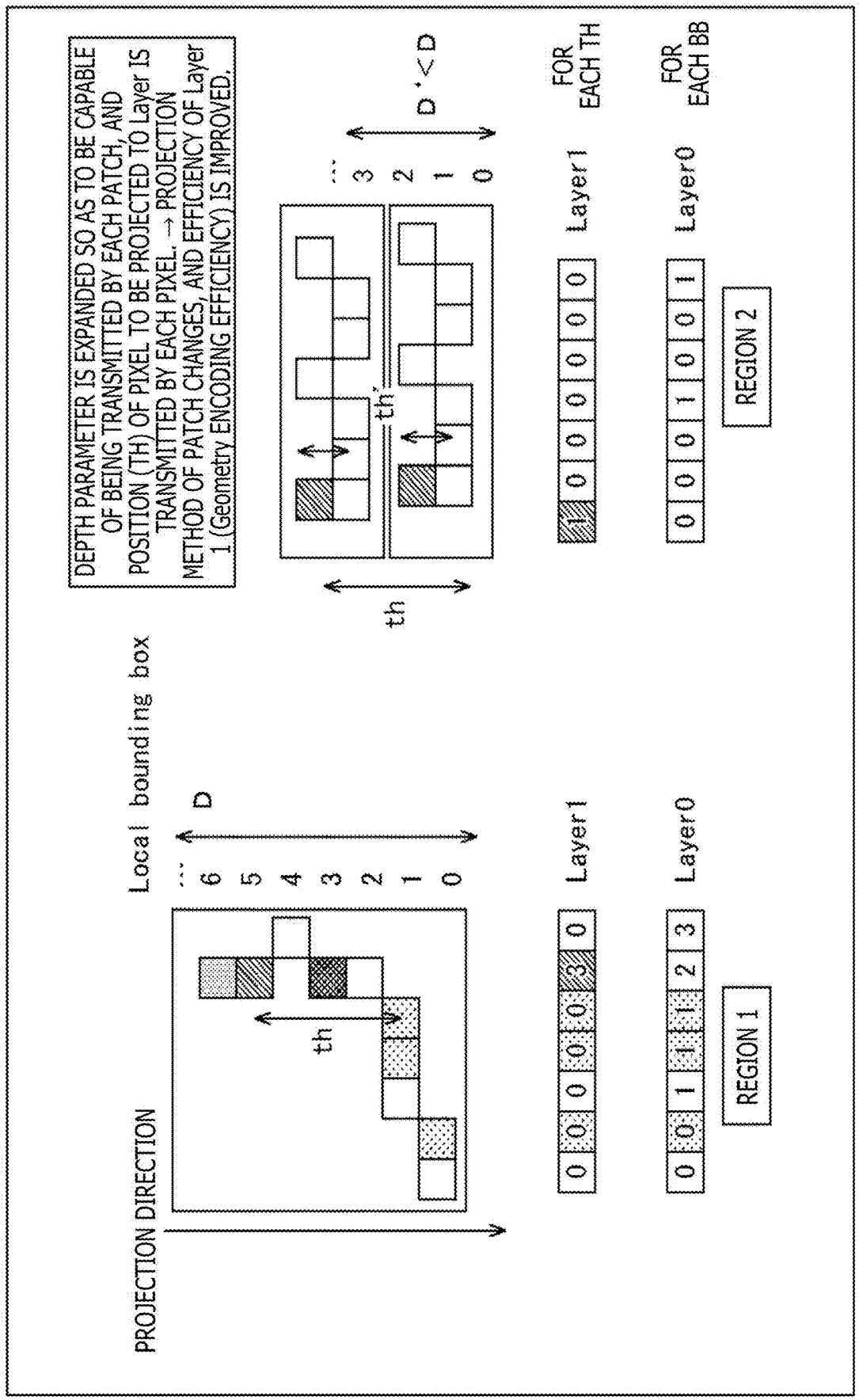
FIG. 21 is a view depicting an example of a manner of two-dimensional projection to which the present technology is applied.

For example, as depicted in FIG. 21, the image processing apparatus is expanded such that the depth parameter is transmitted by each patch and the position (TH) of a pixel to be projected to a layer (Layer) is transmitted by each region. This makes it possible, for example, to set a depth parameter th for a region 1 and set a depth parameter th' for another region 2. Accordingly, the efficiency of the layer 1 (Layer 1) (Geometry encoding efficiency) is improved.

<Flow of Two-Dimensional Projection Process>

Also in this case, the encoding process and the patch decomposition process are performed similarly as in the case described hereinabove in connection with the first embodiment. Accordingly, description of them is omitted.

Figure 22:
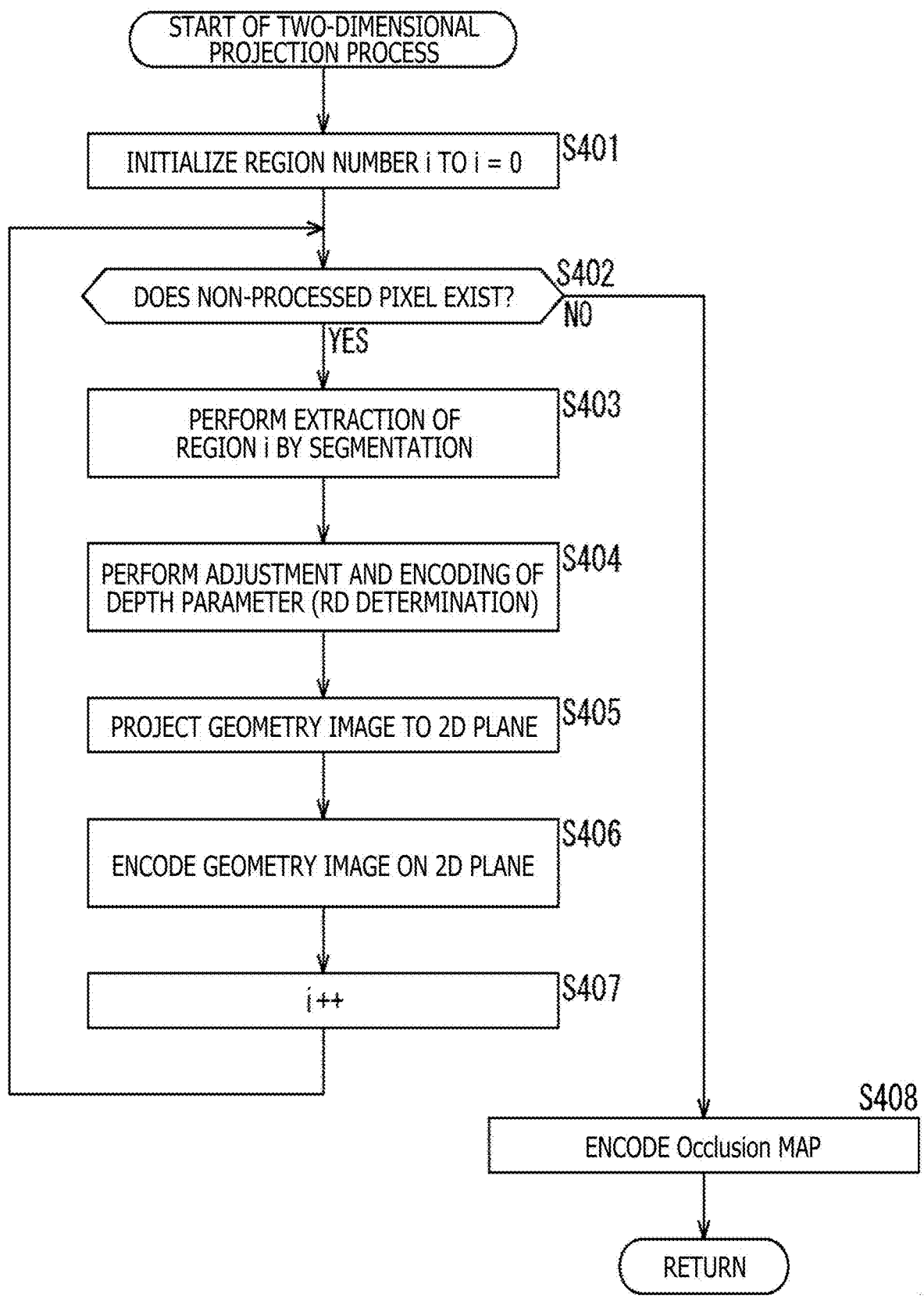
FIG. 22 is a flow chart illustrating an example of a flow of a two-dimensional projection process.

An example of a flow of the two-dimensional projection process in this case executed in step S124 of FIG. 11 is described with reference to a flow chart of FIG. 22.

After the two-dimensional projection process is started, the pixel distribution analysis section 155 initializes the region number i to i=0 in step S401.

In step S402, the pixel distribution analysis section 155 determines whether or not an unprocessed pixel exists. In the case where it is determined that an unprocessed pixel exists, the processing advances to step S403.

In step S403, the two-dimensional projection section 154 performs extraction of the region i by segmentation.

In step S404, the two-dimensional projection section 154 performs adjustment and encoding (RD determination) of a depth parameter. In short, setting of an optimum depth parameter th and range of the region is performed by the RD determination.

In step S405, the two-dimensional projection section 154 projects a geometry image of the processing target region i to the two-dimensional plane on the basis of the setting performed in step S404.

In step S406, the two-dimensional projection section 154 causes the geometry image projected to the two-dimensional plane to be encoded.

In step S407, the pixel distribution analysis section 155 increments the variable i (i++). After the process in step S407 ends, the processing returns to step S402 to repeat the processes beginning with step S402.

On the other hand, in the case where it is determined in step S402 that an unprocessed pixel does not exist, the processing advances to step S408.

In step S408, the two-dimensional projection section 154 causes an occlusion map (Occlusion Map) to be encoded. When the process in step S408 ends, the two-dimensional projection process ends, and the processing returns to FIG. 11.

By performing the two-dimensional projection process in such a manner as described above, the encoding apparatus 100 can obtain a depth parameter th more suitable for each region and decrease of the encoding efficiency can be suppressed.

<Use of Controlled Depth Parameter>

The decoding side is configured such that, when 3D data projected to a two-dimensional plane is to be projected to a three-dimensional space, the 3D data are projected to a range indicated by a depth parameter th controlled in such a manner as described above.

In particular, when, by each predetermined region of the three-dimensional space, pieces of data for each position included in 3D data representative of a three-dimensional structure projected to a two-dimensional plane are projected to the three-dimensional space, the pieces of data for each position are projected within the range in the depthwise direction of data indicated by a depth parameter restricting the range in the depthwise direction of data for each position of the 3D data that can be projected to one layer set for each region of the three-dimensional space. For example, the image processing apparatus is provided with a three-dimensional projection section for projecting, when, by each predetermined region of the three-dimensional space, pieces of data for each position included in 3D data representative of a three-dimensional structure projected to a two-dimensional plane are projected to the three-dimensional space, the pieces of data for each position within the range in the depthwise direction of data indicated by a depth parameter restricting the range in the depthwise direction of data for each position of the 3D data that can be projected to one layer set for each region of the three-dimensional space.

Since this makes it possible to perform projection of 3D data to a three-dimensional space by using the depth parameter th set for each region, decrease of the encoding efficiency can be suppressed.

<Flow of Three-Dimensional Projection Process>

Also in this case, the decoding process and the point cloud re-construction process are performed similarly as in the case described hereinabove in connection with the first embodiment. Accordingly, description of them is omitted.

Figure 23:
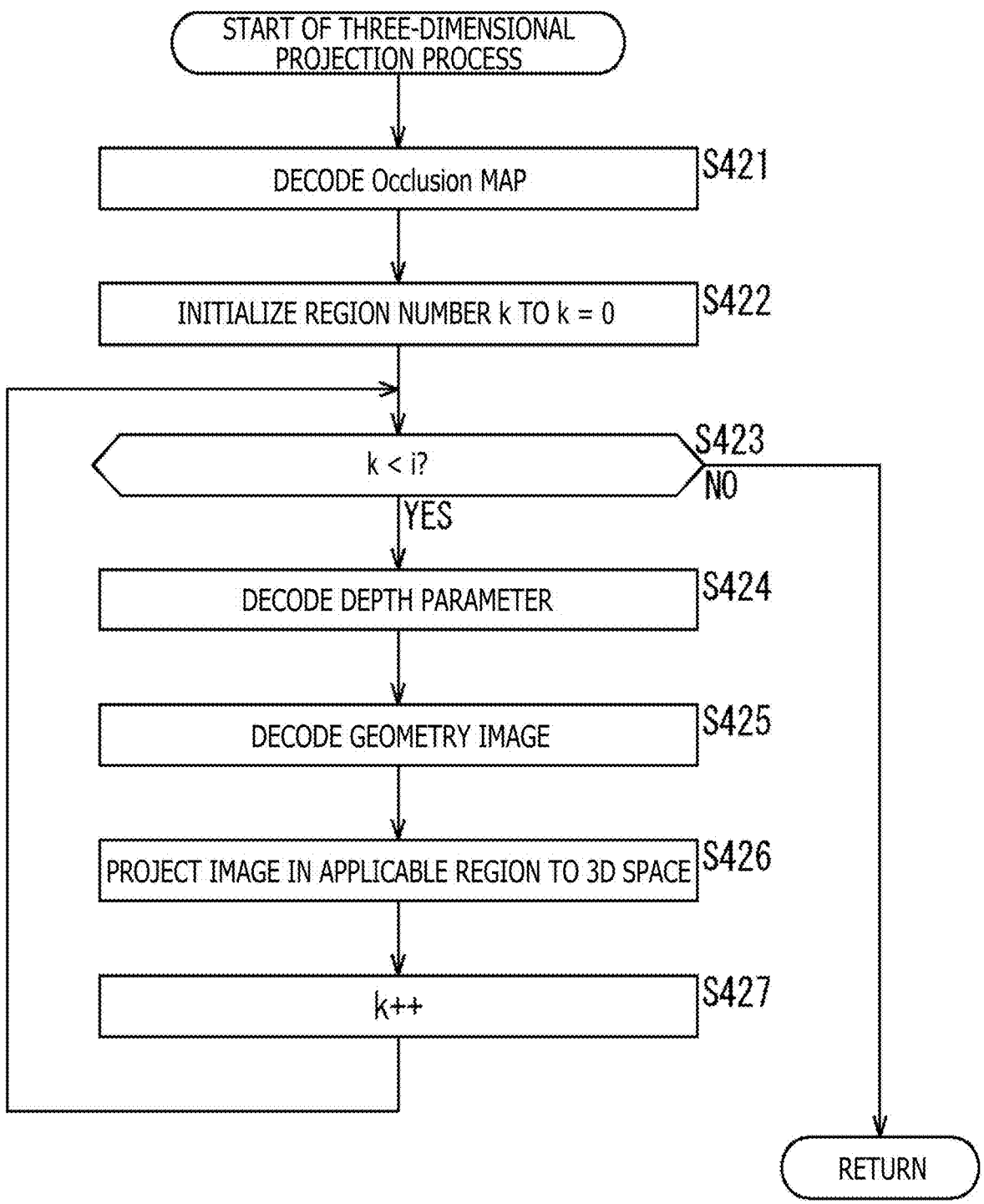
FIG. 23 is a flow chart illustrating an example of a flow of a three-dimensional projection process.

An example of a flow of the three-dimensional projection process in this case executed in step S221 of FIG. 14 is described with reference to a flow chart of FIG. 23.

After the three-dimensional projection process is started, the three-dimensional projection unit 251 causes an Occlusion map to be decoded in step S421.

In step S422, the pixel distribution analysis section 252 initializes the region number k to k=0.

In step S423, the pixel distribution analysis section 252 determines whether or not the variable k satisfies k<i. In the case where it is determined that k<i holds, the processing advances to step S424.

In step S424, the three-dimensional projection section 251 causes the depth parameter th to be decoded. In step S425, the three-dimensional projection section 251 causes a geometry image to be decoded. In step S426, the three-dimensional projection section 251 projects an image of the region to a three-dimensional space.

In step S427, the pixel distribution analysis section 252 increments the variable k (k++). After the process in step S427 ends, the processing returns to step S423 to repeat the processes beginning with step S423.

On the other hand, in the case where it is determined that k<i is not satisfied, the three-dimensional projection process is ended, and the processing returns to FIG. 14.

By executing the three-dimensional projection process in such a manner as described above, the decoding apparatus 200 can perform projection of 3D data to a three-dimensional space by using the depth parameter th set for each region, and therefore, decrease of the encoding efficiency can be suppressed.

5. Supplementary Note

<Control Information>

The control information relating to the present technology having been described in the description of the embodiments may be transmitted from the encoding side to the decoding side. For example, control information (for example, enabled flag) for controlling whether or not application of the present technology described above is to be permitted (or inhibited) may be transmitted. Further, for example, control information that designates a range within which application of the present technology described hereinabove is to be permitted (or inhibited) (for example, an upper limit or a lower limit of a block size or both of them, a slice, a picture, a sequence, a component, a view, a layer, or the like) may be transmitted.

<Computer>

While the series of processes described above can be executed by hardware, it can otherwise be executed by software as well. In the case where the series of processes is to be executed by software, a program that constructs the software is installed into a computer. Examples of the computer here include a computer incorporated in hardware for exclusive use and a personal computer for universal use that can execute various functions by installing various programs into the personal computer.

FIG. 24 is a block diagram depicting an example of a hardware configuration of a computer that executes the series of processes described hereinabove in accordance with a program.

In a computer 900 depicted in FIG. 24, a CPU (Central Processing Unit) 901, a ROM (Read Only Memory) 902, and a RAM (Random Access Memory) 903 are connected to one another by a bus 904.

An input/output interface 910 is also connected to the bus 904. An inputting section 911, an outputting section 912, a storage section 913, a communication section 914, and a drive 915 are connected to the input/output interface 910.

The inputting section 911 includes, for example, a keyboard, a mouse, a microphone, a touch panel, an input terminal, and so forth. The outputting section 912 includes, for example, a display, a speaker, an output terminal and so forth. The storage section 913 includes, for example, a hard disk, a RAM disk, a nonvolatile memory, or the like. The communication section 914 includes, for example, a network interface. The drive 915 drives a removable medium 921 such as a magnetic disk, an optical disk, a magneto-optical disk, or a semiconductor memory.

In the computer configured in such a manner as described above, the CPU 901 loads a program stored, for example, in the storage section 913 into the RAM 903 through the input/output interface 910 and the bus 904 and executes the program to perform the series of processes described above. Into the RAM 903, data and so forth necessary for the CPU 901 to execute various processes are also stored suitably.

The program to be executed by the computer (CPU 901) can be recorded on and applied as a removable medium 921 as, for example, a package medium. In such case, by mounting the removable medium 921 on the drive 915, the program can be installed into the storage section 913 through the input/output interface 910.

Also, it is possible to provide this program through a wired or wireless transmission medium such as a local area network, the Internet, or a digital satellite broadcast. In such case, the program can be received by the communication section 914 and installed into the storage section 913.

Alternatively, it is also possible to install the program in the ROM 902 or the storage section 913 in advance.

<Application Target of Present Technology>

While the foregoing description is directed to cases in which the present technology is applied to Voxelization of point cloud data, the present technology is not limited to those examples and can be applied to Voxelization of 3D data of any standard. In other words, specifications of various processes such as encoding and decoding methods and various kinds of data such as 3D data and metadata can freely be selected unless they are contradictory to the present technology described above. Further, part of the processes and specifications described above may be omitted unless such omission is contradictory to the present technology.

Further, while the foregoing description is directed to the encoding apparatus 100 and the decoding apparatus 200 as application examples of the present technology, the present technology can be applied to any freely-selected configuration.

For example, the present technology can be applied to various kinds of electronic equipment such as a transmitter and a receiver (for example, a television receiver and a portable telephone set) in satellite broadcasting, cable broadcasting of a cable TV, delivery on the Internet, or delivery to a terminal by cellular communication or an apparatus that records an image on a medium such as an optical disk, a magnetic disk or a flash memory or reproduces an image from such recording media (for example, a hard disk recorder and a camera).

Further, for example, the present technology can be carried out as a configuration of part of an apparatus such as a processor as a system LSI (Large Scale Integration) or the like (for example, a video processor), a module that uses a plurality of processors and so forth (for example, a video module), a unit that uses a plurality of modules and so forth (for example, a video unit) or a set in which other functions are further added to a unit (for example, a video set).

Further, for example, the present technology can also be applied to a network system configured from plural apparatuses. For example, the present technology may be carried out in cloud computing by which plural apparatuses share and cooperate for processing through a network. For example, the present technology may be carried out in a cloud service that provides a service relating to an image (moving image) to a freely-selected terminal such as a computer, AV (Audio Visual) equipment, a portable information processing terminal, and an IoT (Internet of Things) device.

It is to be noted that, in the present specification, the term "system" is used to signify an aggregation of plural components (devices, modules (parts) and so forth) and it does not matter whether or not all components are accommodated in the same housing. Accordingly, plural apparatuses accommodated in separate housings and connected to each other through a network are a system, and one apparatus in which plural modules are accommodated in a single housing is also a system.

<Field and Use to which Present Technology is Applicable>

A system, an apparatus, a processing unit, and so forth to which the present technology is applied can be used in any field, for example, transportation, medical care, crime prevention, agriculture, livestock industry, mining, beauty culture, factories, home appliances, weather, and natural surveillance. Also, the usage of them can freely be selected.

Further, the present technology can be applied to systems and devices used for provision of appreciation content and so forth. Further, for example, the present technology can also be applied to systems and devices used for transportation such as supervision of traffic conditions and automatic operation control. Further, for example, the present technology can also be applied to systems and devices for use for security. Further, for example, the present technology can be applied to systems and devices for use for automatic control of machines and so forth. Further, for example, the present technology can also be applied to systems and devices for use for agriculture and livestock industry. Further, the present technology can also be applied to systems and devices for supervising, for example, natural states of a volcano, woods, and a coast, wildlife, and so forth. Furthermore, for example, the present technology can also be applied to systems and devices for use for sports.

<Others>

It is to be noted that the term "flag" in the present specification signifies information for identifying plural states and includes not only information to be used when two states of the true (1) and the false (0) are to be identified but also information capable of identifying three or more states. Accordingly, the value that can be used by the "flag" may be, for example, two values of I/O or may be three or more values. In other words, the bit number configuring the "flag" may freely be selected and may be 1 bit or plural bits. Further, the identification information (including a flag) is assumed to have not only a form in which the identification information is included in a bit stream but also a form in which difference information of the identification information with respect to information that becomes a certain reference is included in a bit stream. Therefore, in the present specification, the "flag" and the "identification information" include not only such information as described above but also difference information with respect to information that serves as a reference.

Further, various kinds of information (metadata and so forth) relating to encoded data (bit stream) may be transmitted or recorded in any form if they are associated with the encoded data. Here, the term "associate" signifies that, for example, when one piece of data is to be processed, the other piece of data is made available (linkable). In short, pieces of data associated with each other may be put together as one data or may be individual separate data. For example, information associated with encoded data (image) may be transmitted on a transmission line different from that of the encoded data (image). Further, for example, information associated with encoded data (image) may be recorded on a recording medium separate from that of the encoded data (image) (or in a different recording area of the same recording medium). It is to be noted that this "association" may be present in part of such data instead of the overall data. For example, an image and information corresponding to the image may be associated with each other in any unit such as plural frames, one frame, or a portion in a frame.

It is to be noted that, in the present specification, such terms as "synthesize," "multiplex," "add," "integrate," "include," "store," "put forth," "put in," and "insert" signify to combine multiple things into one such as to combine, for example, encoded data and metadata into one data and signify one method of the "association" described above.

Further, the embodiment of the present technology is not limited to the embodiments described hereinabove and allows various alterations without departing from the subject matter of the present technology.

For example, the configuration described as one apparatus (or one processing section) may be divided so as to configure plural apparatuses (or processing sections). Conversely, the configurations described as plural apparatuses (or processing sections) in the foregoing description may be put together so as to configure a single apparatus (or processing section). Further, a configuration not described hereinabove may naturally be added to the configuration of the apparatus (or processing sections). Furthermore, if a configuration or operation of an entire system is substantially the same, part of the configuration of a certain apparatus (or processing section) may be included in the configuration of another apparatus (or another processing section).

Further, for example, the program described above may be executed by any freely-selected apparatus. In such case, it is sufficient if the apparatus has necessary functions (functional blocks and so forth) and can obtain necessary information.

Further, for example, each of the steps of one flow chart may be executed by a single apparatus or may be shared and executed by plural apparatus. Further, in the case where plural processes are included in one step, the plural processes may be executed by one apparatus or may be shared and executed by plural apparatus. In other words, it is also possible to execute plural processes included in one step as a process of plural steps. Conversely, it is also possible to execute a process described as plural steps collectively as one step.

Further, for example, in a program to be executed by a computer, processes of steps that describe the program may be carried out in a time series in the order as described in the present specification or may be executed in parallel or individually at necessary timings such as the time when a call is made. In short, the processes in the steps may be executed in an order different from the order described hereinabove unless any contradiction arises. Further, the processes in the steps that describe this program may be executed in parallel to processes of another program or may be executed in combination with processes of another apparatus.

Further, for example, plural technologies relating to the present technology can be carried out alone and independently of each other unless any contradiction arises. Naturally, any plural number of present technologies can be carried out together. For example, it is also possible to carry out part or the entirety of the present technology described in connection with any of the embodiments in combination with part or the entirety of the present technology described in connection with a different one or ones of the embodiments. Further, it is also possible to carry out any freely-selected part or the entirety of the present technology together with any other technology that is not described hereinabove.

It is to be noted that the present technology can also take such a configuration as described below.

(1)

An image processing apparatus, including:

a two-dimensional projection section configured to project all pieces of data for each position included in 3D data representative of a three-dimensional structure to a two-dimensional plane of plural layers.

(2)

The image processing apparatus according to (1), in which the two-dimensional projection section projects pieces of data for each position overlapping in position with each other in a depthwise direction as viewed from a projection place that are included in the 3D data to layers of the two-dimensional plane of the plural layers, the layers being different from each other.

(3)

The image processing apparatus according to (2), in which the two-dimensional projection section generates, in regard to the two-dimensional plane, layers in a number equal to a maximum number of the pieces of data for each position overlapping in position with each other in the depthwise direction as viewed from the projection plane that are included in the 3D data.

(4)

The image processing apparatus according to any one of (1) to (3), further including:

an encoding section configured to encode the 3D data projected to the two-dimensional plane by the two-dimensional projection section.

(5)

The image processing apparatus according to (4), in which the encoding section encodes each of position information, attribute information, and an occupancy map of the 3D data projected on each layer of the two-dimensional plane.

(6)

The image processing apparatus according to (4) or (5), further including:

a bit stream generation section configured to generate a bit stream including information indicative of the number of layers of the two-dimensional plane to which the 3D data is projected by the two-dimensional projection section and encoded data obtained by encoding the two-dimensional plane by the encoding section.

(7)

The image processing apparatus according to any one of (4) to (6), further including:

a packing section configured to perform packing of the two-dimensional plane to which the 3D data is projected by the two-dimensional projection section, as a video frame, in which the encoding section is configured such that the video frame in which the two-dimensional plane is packed by the packing section is encoded.

(8)

The image processing apparatus according to any one of (1) to (7), in which the two-dimensional projection section projects the 3D data to the two-dimensional plane by each predetermined region.

(9)

The image processing apparatus according to any one of (1) to (8), in which the 3D data includes a point cloud.

(10)

An image processing method, including:

projecting all pieces of data for each position included in 3D data representative of a three-dimensional structure to a two-dimensional plane of plural layers.

An image processing apparatus, including:

a three-dimensional projection section configured to project all pieces of data for each position of 3D data projected to a two-dimensional plane having the number of layers indicated by layer number information to a three-dimensional space.

(12)

The image processing apparatus according to (11), further including:

an extraction section configured to extract the layer number information included in a bit stream, in which the three-dimensional projection section is configured such that all pieces of data for each position of the 3D data projected to the two-dimensional plane having the number of layers indicated by the layer number information extracted by the extraction section are projected to the three-dimensional space.

(13)

The image processing apparatus according to (12), further including:

a decoding section configured to decode encoded data of the 3D data projected to the two-dimensional plane included in the bit stream, in which the three-dimensional projection section is configured such that all pieces of data for each position of the 3D data obtained by decoding the encoded data by the decoding section and projected to the two-dimensional plane are projected to the three-dimensional space.

(14)

The image processing apparatus according to (13), in which the decoding section decodes encoded data of each of position information, attribute information, and an occupancy map of the 3D data projected to each layer of the two-dimensional plane.

(15)

The image processing apparatus according to (13) or (14), further including:

an unpacking section configured to unpack a video frame that is obtained by decoding the encoded data by the decoding section and in which the 3D data projected to the two-dimensional plane is packed, in which the three-dimensional projection section is configured such that all pieces of data for each position of the 3D data obtained by unpacking the video frame by the unpacking section and projected to the two-dimensional plane are projected to the three-dimensional space.

(16)

The image processing apparatus according to any one of (11) to (15), in which the three-dimensional projection section projects the 3D data projected to the two-dimensional plane by each predetermined region to the three-dimensional space.

(17)

The image processing apparatus according to any one of (11) to (16), in which the 3D data includes a point cloud.

(18)
An image processing method, including:
projecting all pieces of data for each position of 3D data projected to a two-dimensional plane having the number of layers indicated by layer number information to a three-dimensional space.

(21)
An image processing apparatus, including:
a two-dimensional projection section configured to project data for each position included in 3D data representative of a three-dimensional structure to a two-dimensional plane and to set, for a position of the two-dimensional plane at which the data for each position does not exist, a predetermined value indicating that the data for each position does not exist.

(22)
The image processing apparatus according to (21), in which
the predetermined value includes a fixed value determined in advance.

(23)
The image processing apparatus according to (21), in which the predetermined value includes a value higher than a maximum value of a depth of the 3D data.

(24)
The image processing apparatus according to any one of (21) to (23), further including:
an encoding section configured to encode the 3D data projected to the two-dimensional plane by the two-dimensional projection section.

(25)
The image processing apparatus according to (24), in which
the encoding section encodes each of position information, attribute information, and an occupancy map of the 3D data projected to the two-dimensional plane.

(26)
The image processing apparatus according to (24) or (25), further including:
a bit stream generation section configured to generate a bit stream including information indicative of the predetermined value and encoded data obtained by encoding the two-dimensional plane by the encoding section.

(27)
The image processing apparatus according to any one of (24) to (26), further including:
a packing section configured to perform packing of the two-dimensional plane to which the 3D data is projected by the two-dimensional projection section, as a video frame, in which
the encoding section is configured such that the video frame in which the two-dimensional plane is packed by the packing section is encoded.

(28)
The image processing apparatus according to any one of (21) to (27), in which
the two-dimensional projection section projects the 3D data to the two-dimensional plane by each predetermined region.

(29)
The image processing apparatus according to any one of (21) to (28), in which
the 3D data includes a point cloud.

(30)
An image processing method, including:
projecting data of each position included in 3D data representative of a three-dimensional structure to a two-dimensional plane and setting, for a position of the two-dimensional plane at which the data for each position does not exist, a predetermined value indicating that the data for each position does not exist.

(31)
An image processing apparatus, including:
a three-dimensional projection section configured to project, to a three-dimensional space, data that is among pieces of data for each position included in 3D data representative of a three-dimensional structure projected to a two-dimensional plane and that is other than data having a predetermined value indicating that the data for each position does not exist.

(32)
The image processing apparatus according to (31), in which
the predetermined value includes a fixed value determined in advance.

(33)
The image processing apparatus according to (31), in which
the predetermined value includes a value higher than a maximum value of a depth of the 3D data.

(34)
The image processing apparatus according to any one of (31) to (33), further including:
an extraction section configured to extract information indicative of the predetermined value included in a bit stream, in which
the three-dimensional projection section is configured such that data that is among the pieces of data for each position included in the 3D data and that is other than data having the predetermined value indicated in the information extracted by the extraction section is projected to the three-dimensional space.

(35)
The image processing apparatus according to (34), further including:
a decoding section configured to decode encoded data of the 3D data included in the bit stream and projected to the two-dimensional plane, in which
the three-dimensional projection section is configured such that data that is among the pieces of data for each position included in the 3D data obtained by decoding the encoded data by the decoding section and projected to the two-dimensional plane and that is other than data having the predetermined value indicated in the information extracted by the extraction section is projected to the three-dimensional space.

(36)
The image processing apparatus according to (35), in which
the decoding section decodes encoded data of each of position information, attribute information, and an occupancy map of the 3D data projected to each layer of the two-dimensional plane.

(37)
The image processing apparatus according to (35) or (36), further including:
an unpacking section configured to unpack a video frame in which the 3D data obtained by decoding the encoded data by the decoding section and projected to the two-dimensional plane is packed, in which
the three-dimensional projection section is configured such that data that is among the pieces of data for each position included in the 3D data obtained by unpacking the video frame by the unpacking section and projected to the two-dimensional plane and that is other than data having the predetermined value indicated in the information extracted by the extraction section is projected to the three-dimensional space.

(38)

The image processing apparatus according to any one of (31) to (37), in which
the three-dimensional projection section projects the 3D data projected to the two-dimensional plane by each predetermined region to the three-dimensional space.

(39)

The image processing apparatus according to any one of (31) to (38), in which
the 3D data includes a point cloud.

(40)

An image processing method, including:
projecting data that is among pieces of data for each position included in 3D data representative of a three-dimensional structure projected to a two-dimensional plane and that is other than data having a predetermined value indicating that the data for each position does not exist to a three-dimensional space.

(41)

An image processing apparatus, including:
a two-dimensional projection section configured to project, when pieces of data for each position of 3D data representative of a three-dimensional structure are projected to a two-dimensional plane by each predetermined region of a three-dimensional space, the pieces of data for each position within a range in a depthwise direction indicated by a depth parameter restricting the range in the depthwise direction of the pieces of data for each position of the 3D data representative of a three-dimensional structure capable of being projected to one layer set for each region, to the two-dimensional plane.

(42)

The image processing apparatus according to (41), further including:
an encoding section configured to encode the 3D data projected to the two-dimensional plane by the two-dimensional projection section.

(43)

The image processing apparatus according to (42), in which
the encoding section encodes each of position information, attribute information, and an occupancy map of the 3D data projected to the two-dimensional plane.

(44)

The image processing apparatus according to (42) or (43), further including:
a bit stream generation section configured to generate a bit stream including the depth parameter set for each region and encoded data obtained by encoding the two-dimensional plane by the encoding section.

(45)

The image processing apparatus according to any one of (42) to (44), further including:
a packing section configured to pack the two-dimensional plane to which the 3D data is projected by the two-dimensional projection section, as a video frame, in which
the encoding section is configured such that the video frame in which the two-dimensional plane is packed by the packing section is encoded.

(46)

The image processing apparatus according to any one of (41) to (45), in which
the 3D data includes a point cloud.

(47)

An image processing method, including:
projecting, when pieces of data for each position of 3D data representative of a three-dimensional structure are projected to a two-dimensional plane by each predetermined region of a three-dimensional space, the pieces of data for each position within a range in a depthwise direction indicated by a depth parameter restricting the range in the depthwise direction of the pieces of data for each position of the 3D data representative of a three-dimensional structure capable of being projected to one layer set for each region.

(51)

An image processing apparatus, including:
a three-dimensional projection section configured to project, when pieces of data for each position included in 3D data representative of a three-dimensional structure projected to a two-dimensional plane are projected to a three-dimensional space by each predetermined region of the three-dimensional space, the pieces of data for each position within a range in a depthwise direction indicated by a depth parameter restricting the range in the depthwise direction of the pieces of data for each position of the 3D data capable of being projected to one layer set for each region, to the three-dimensional space.

(52)

The image processing apparatus according to (51), further including:
an extraction section configured to extract the depth parameter included in a bit stream, in which
the three-dimensional projection section is configured such that the pieces of data for each position included in the 3D data are projected within the range in the depthwise direction indicated by the depth parameter extracted by the extraction section.

(53)

The image processing apparatus according to (52), further including:
a decoding section configured to decode encoded data of the 3D data projected to the two-dimensional plane included in the bit stream, in which
the three-dimensional projection section is configured such that the pieces of data for each position of the 3D data obtained by decoding the encoded data by the decoding section and projected to the two-dimensional plane are projected within the range in the depthwise direction indicated by the depth parameter extracted by the extraction section.

(54)

The image processing apparatus according to (53), in which
the decoding section decodes encoded data of each of position information, attribute information, and an occupancy map of the 3D data projected to each layer of the two-dimensional plane.

(55)

The image processing apparatus according to (53) or (54), further including:
an unpacking section configured to unpack a video frame in which the 3D data obtained by decoding the encoded data by the decoding section and projected to the two-dimensional plane is packed, in which
the three-dimensional projection section is configured such that the pieces of data for each position of the 3D data obtained by unpacking the video frame by the unpacking section and projected to the two-dimensional plane are projected within the range in the depthwise direction indicated by the depth parameter extracted by the extraction section.

(56)
The image processing apparatus according to any one of (51) to (55), in which
the 3D data includes a point cloud.

(57)
An image processing method, including:
projecting, when pieces of data for each position included in 3D data representative of a three-dimensional structure projected to a two-dimensional plane are projected to a three-dimensional space by each predetermined region of the three-dimensional space, the pieces of data for each position within a range in a depthwise direction indicated by a depth parameter restricting the range in the depthwise direction of the pieces of data for each position of the 3D data capable of being projected to one layer set for each region, to the three-dimensional space.

REFERENCE SIGNS LIST

100 Encoding apparatus, 111 Patch decomposition section, 112 Packing section, 113 Auxiliary patch information compression section, 114 Video encoding section, 115 Video encoding section, 116 O Map encoding section, 117 Multiplexer, 151 Normal direction estimation section, 152 Segmentation initial setting section, 153 Segmentation updating section, 154 Two-dimensional projection section, 155 Pixel distribution analysis section, 200 Decoding apparatus, 211 Demultiplexer, 212 Auxiliary patch information decoding section, 213 Video decoding section, 214 Video decoding section, 215 O Map decoding section, 216 Unpacking section, 217 3D re-construction section 251 Three-dimensional projection section, 252 Pixel distribution analysis section 253 inverse segmentation updating section, 254 Inverse segmentation initial setting section, 255 Inverse normal direction estimation section

The invention claimed is:

1. An image encoding apparatus, comprising:
circuitry configured to:
define a bounding box containing 3D data;
project positional data of the 3D data to at least three 2D layers in a depthwise direction of the bounding box, wherein depth values of the 2D layers are different from each other in the depthwise direction;
encode the projected positional data; and
generate a bit stream including the encoded positional data and signal information representing the number of the 2D layers.

2. The image encoding apparatus according to claim 1, wherein
the 3D data includes at least three overlapping points that are projected to the respective 2D layers different from each other and each have a same positional data viewed from the depthwise direction.

3. The image encoding processing apparatus according to claim 2, wherein
the circuitry is further configured to generate a same number of the 2D layers as a maximum number of overlap among the overlapping points.

4. The image encoding apparatus according to claim 1, wherein
the circuitry is further configured to set a fixed value to a position of at least one of the 2D layers where no positional data is projected.

5. The image encoding apparatus according to claim 1, wherein
the circuitry is further configured to set, to a position of at least one of the 2D layers where no positional data is projected, a value higher than a maximum value of a depth of the 3D data.

6. The image encoding apparatus according to claim 1, wherein
the circuitry is configured to project the positional data of 3D data to the 2D layers on a basis of a depth parameter indicating a range with respect to each of the 2D layers in the depthwise direction where the projection of the positional data is allowed.

7. The image encoding apparatus according to claim 1, wherein
the 3D data includes point cloud data where each point is represented by position information and attribute information.

8. An image encoding method, comprising:
defining a bounding box containing 3D data;
projecting positional data of the 3D data to at least three 2D layers in a depthwise direction of the bounding box, wherein depth values of the 2D layers are different from each other in the depthwise direction;
encoding the projected positional data; and
generating a bit stream including the encoded positional data and signal information representing the number of the 2D layers.

9. An image decoding apparatus, comprising:
circuitry configured to:
decode, from a bitstream, signal information representing a number of 2D layers,
wherein the 2D layers are defined to a bounding box defined to reconstruct 3D data, and
wherein depth values of the 2D layers are different from each other in a depthwise direction of the bounding box;
decode, from the bitstream, encoded positional data to acquire geometry images representing the 3D data,
wherein each of the geometry images represents a corresponding one of the 2D layers to which the 3D data is projected,
wherein the number of geometry images is equal to the number of the 2D layers; and
construct, based on the signal information, the 3D data by projecting each of the geometry images in a three dimensional space in the depthwise direction.

10. The image decoding apparatus according to claim 9, wherein
the circuitry is configured to construct the 3D data by projecting each of the geometry images in the three dimensional space in the depthwise direction using data other than data of the geometry images having a fixed value representing no positional data.

11. The image decoding apparatus according to claim 9, wherein
the circuitry is configured to construct the 3D data by projecting each of the geometry images in the three dimensional space in the depthwise direction using data other than data of the geometry images having a value higher than a maximum value of a depth of the 3D data.

12. The image decoding apparatus according to claim 9, wherein
the circuitry is configured to construct the 3D data by projecting each of the geometry images on a basis of a depth parameter indicating a range in the three dimensional space in the depthwise direction where the projection of the positional data is allowed.

13. The image decoding apparatus according to claim 9, wherein
the 3D data includes point cloud data where each point of the point cloud data is represented by position information and attribute information.

14. An image decoding method, comprising:
decoding, from a bitstream, signal information representing the number of 2D layers,
  wherein the 2D layers are defined to a bounding box defined to reconstruct 3D data, and
  wherein depth values of the 2D layers are different from each other in a depthwise direction of the bounding box;
decoding, from the bitstream, encoded positional data to acquire geometry images representing the 3D data,
  wherein the number of geometry images is equal to the number of the 2D layers;
projecting, based on the signal information, each of the geometry images to a corresponding one of the 2D layers in the depthwise direction; and
reconstructing the 3D data based on the projected geometry images.

* * * * *